(12) United States Patent
Osmak et al.

(10) Patent No.: US 10,990,881 B1
(45) Date of Patent: Apr. 27, 2021

(54) PREDICTIVE ANALYTICS USING SENTENCE DATA MODEL

(71) Applicant: Progress Software Corporation, Bedford, MA (US)

(72) Inventors: Ivan Osmak, Sofia (BG); Thomas Krüger, Sofia (BG)

(73) Assignee: Progress Software Corporation, Bedford, MA (US)

( * ) Notice: Subject to any disclaimer, the term of this patent is extended or adjusted under 35 U.S.C. 154(b) by 935 days.

(21) Appl. No.: 14/835,151

(22) Filed: Aug. 25, 2015

Related U.S. Application Data

(60) Provisional application No. 62/042,246, filed on Aug. 26, 2014, provisional application No. 62/042,243, filed on Aug. 26, 2014.

(51) Int. Cl.
  *G06N 5/02* (2006.01)
(52) U.S. Cl.
  CPC ..................... *G06N 5/02* (2013.01)
(58) Field of Classification Search
  CPC ........................................................ G06N 5/02
  See application file for complete search history.

(56) References Cited

U.S. PATENT DOCUMENTS

| | | | | |
|---|---|---|---|---|
| 5,581,634 A * | 12/1996 | Heide | ................ | G06K 9/4638 382/203 |
| 6,338,055 B1 * | 1/2002 | Hagmann | ......... | G06F 17/30448 |
| 6,675,159 B1 * | 1/2004 | Lin | ..................... | G06F 17/2705 |
| 2010/0153160 A1 * | 6/2010 | Bezemer | ................ | G06Q 10/06 705/7.12 |
| 2015/0100568 A1 * | 4/2015 | Golden | ............. | G06F 17/30651 707/722 |
| 2016/0012122 A1 * | 1/2016 | Franceschini | ....... | G06F 16/3334 707/739 |

OTHER PUBLICATIONS

Neumayer, R., Balog, K., & Nørvåg, K. (Apr. 2012). On the modeling of entities for ad-hoc entity search in the web of data. In European Conference on Information Retrieval (pp. 133-145). Springer, Berlin, Heidelberg. (Year: 2012).*

(Continued)

*Primary Examiner* — Ann J Lo
*Assistant Examiner* — Oluwatosin O Alabi
(74) *Attorney, Agent, or Firm* — Patent Law Works LLP

(57) ABSTRACT

Systems and methods are described herein. In one embodiment, the method includes receiving a goal associated with a predicate-object pair; receiving utilization data including a plurality of predicate-object pairs including the predicate-object pair associated with the goal; determining a prediction model comprising a plurality of nodes that form a hierarchical structure including a root node and two or more leaf nodes and organized based on one or more of an information gain and a business gain, the two or more leaf nodes including a leaf node associated with the predicate-object pair of the goal; identifying nodes in the hierarchical structure that trace a path from the root node to the node associated with the goal; and causing a recommendation for at least partial completion of the goal to be presented to a user, the recommendation based on the one or more nodes that trace the path.

20 Claims, 20 Drawing Sheets

(56) References Cited

OTHER PUBLICATIONS

Halpin, H., Robu, V., & Shepard, H. (Nov. 2006). The dynamics and semantics of collaborative tagging. In Proceedings of the 1st semantic authoring and annotation workshop (SAAW'06) (vol. 209). (Year: 2006).*

Atre, M., Srinivasan, J., & Hendler, J. A. (2009). BitMat: A main memory RDF triple store. Proc. of SSWS 2009, 33-48. (Year: 2009).*

Carroll, J. J., Dickinson, I., Dollin, C., Reynolds, D., Seaborne, A., & Wilkinson, K. (May 2004). Jena: implementing the semantic web recommendations. In Proceedings of the 13th international World Wide Web conference on Alternate track papers & posters (pp. 74-83). ACM. (Year: 2004).*

Zhang, X., Hu, B., Chen, J., & Moore, P. (2013). Ontology-based context modeling for emotion recognition in an intelligent web. World Wide Web, 16(4), 497-513 (Year: 2013).*

Kamber, M., Winstone, L., Gong, W., Cheng, S., & Han, J. (Apr. 1997). Generalization and decision tree induction: efficient classification in data mining. In Proceedings Seventh International Workshop on Research Issues in Data Engineering. HP Database Management for Large-Scale Applications (Year: 1997).*

Chen, Z., & Li, T. (Jun. 2007). Addressing diverse user preferences in SQL-query-result navigation. In Proceedings of the 2007 ACM SIGMOD international conference on Management of data (pp. 641-652). (Year: 2007).*

CUNY School of Professional Studies. "Introduction to Entropy for Data Science." YouTube, uploaded by mfschulte222, Sep. 1, 2014, https://youtu.be/IPkRVpXtbdY. PDF of website, 2 pages.

* cited by examiner

202 → 206 ─ 208 ─ 204
2014-07-28 01 /about-us Mozzila
2014-07-29 02 /products/mustang IE

FIG. 2A

| ⌐210 | ⌐212 | ⌐214 | ⌐216 |
|---|---|---|---|
| UserID | Product | Date | Price |
| 1nvd54 | Ford Mustang | 2014-04-06 | $43,000 |
| Fgvb22 | Ford F150 | 2014-05-09 | $22,000 |

FIG. 2B

```
<xml>
<testDrive>
  <driver firstName="Ivan" lastName="Osmak" date="2014-06-09">
    <car>Ford Mustang</car>
    <topSpeed>95</topSpeed>
    <distanceCovered>28</distanceCovered>
    <infotainment>
      <listendTo>
        <song name="Paint it Black" band="Rolling Stones" volume="60%" />
        <song name="Let it be" band="Beatles" volume="20%" />
      </listendTo>
    </infotainment>
  </diver>
</testDrive>
```

FIG. 2C

| | Subject | Predicate | Object |
|---|---|---|---|
| 302 | User 01 | Has visited | /about-us |
| 304 | User 02 | Has visited | /products/mustang |
| 306 | User 1nvd54 | Has bought | Ford Mustang |
| | User Fgb22 | Has bought | Ford F150 |
| 308 | User Ivan Osmak | Has test driven | Ford Mustang |
| | User Ivan Osmak | Has listened to | Paint it Black |
| | User Ivan Osmak | Has had top speed of | 95 |

FIG. 3

| DataSource (String) variable Bytes | Subject (String) variable Bytes | Predicate (String) variable Bytes | Object (String) variable Bytes | TimeStamp (String) variable Bytes |
|---|---|---|---|---|

('CRM', '1234567', 'has bought', 'Enterprise', '2014-08-15T22:49:00')

('Sitefinity', '198A-678B-C56D-819298F3', 'has visited', 'http://sitefinity.com/about.aspx', '2014-08-15T22:50:11')

FIG. 4

| Subject | String Objects |
|---|---|
| Subject 1 | 1 45 97 5645 54544 65485 |
| Subject 2 | 2 6 94 |
| Subject 3 | 5 6 4 3 |
| Subject 4 | 2 3 5 |
| Subject 5 | 7 3 8 |
| Subject 6 | 9 |
| Subject 7 | 10 |
| Subject 8 | 11 |
| ... | ... |
| Subject n | ... |

FIG. 8

| Subject | Attributes (predicate-object pair) | | | | Predicate-object pair of stated goal |
|---|---|---|---|---|---|
| | Property A | Property B | Property C | Property D | Property E |
| 1 | 1 | 3 | 6 | 9 | 12 |
| 2 | 1 | 4 | 6 | 10 | 12 |
| 3 | 2 | 4 | 6 | 10 | 13 |
| 4 | 2 | 3 | 6 | 9 | 12 |
| 5 | 1 | 4 | 6 | 10 | 12 |
| 6 | 1 | 3 | 7 | 10 | 13 |
| 7 | 2 | 4 | 7 | 10 | 13 |
| 8 | 2 | 4 | 8 | 11 | 14 |
| 9 | 1 | 5 | 8 | 10 | 14 |
| 10 | 2 | 5 | 8 | 11 | 14 |

$P(12) = 4/10 = 0.4$
$P(13) = 3/10 = 0.3$
$P(14) = 3/10 = 0.3$ $E(S) = -0.4 \log(0.4, 2) - 0.3 \log(0.3, 2) - 0.3 \log(0.3, 2) = 1.571$

FIG. 9A

FIG. 9C
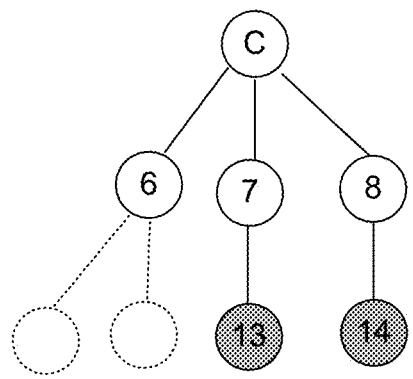
FIG. 9D

| A | B | D | Goal |
|---|---|---|------|
| 1 | 3 | 9 | 12 |
| 1 | 4 | 10 | 12 |
| 2 | 4 | 10 | 13 |
| 2 | 3 | 9 | 12 |
| 1 | 4 | 10 | 12 |

$E(Goal) = 0.722$
$P(12) = 4/5 = 0.8$
$P(13) = 1/5 = 0.2$ $IGA(C) = 0.722 - (2/5*0 + 3/5*0.923) = 0.1682$ $IGA(B) = 0.722 - (2/5*0 + 3/5*0.923) = 0.1682$ $IGA(A) = 0.722 - (3/5*0 + 2/5*1) = 0.322$

| Attribute | Information Gain |
|-----------|------------------|
| A | 0.322 |
| B | 0.168 |
| D | 0.168 |

| A | B | D | Goal |
|---|---|---|------|
| 1 | 3 | 9 | 12 |
| 1 | 4 | 10 | 12 |
| 1 | 4 | 10 | 12 |
| 2 | 4 | 10 | 13 |
| 2 | 3 | 9 | 12 |

932 { (first three rows)
934 { (last two rows)

PREDICTIVE ANALYTICS USING SENTENCE DATA MODEL

CROSS-REFERENCE TO RELATED APPLICATIONS

The present application claims priority to U.S. Provisional Application No. 62/042,246 "Predictive Analytic Methods Using String Objects" and filed Aug. 26, 2014, and U.S. Provisional Application No. 62/042,243 entitled "Predictive Analytics Using Sentence Data Model" and filed Aug. 26, 2014, the contents of each of which are hereby incorporated by references in their entireties.

BACKGROUND

The disclosure relates generally to predictive analytic methods and systems as well as efficient storage and analysis of Big Data. A first deficiency of present solutions is that they lack a universal way to collect and store data. More particularly, present solutions fail to leverage structures present in human language in order to collect and store data, which may be of different types and/or from different sources including legacy systems, in a uniform manner for subsequent utilization. A second deficiency of existing solutions is that they fail to cast between data types and/or leverage native function calls (e.g. those for strings) and achieve greater speed and efficiency. A third deficiency of existing solutions is that they fail to utilize abstraction (e.g. mapping to a number/numeric symbol) in order to reduce memory utilization to a level that may be entirely stored in and retrieved from volatile memory and benefit from the performance gains associated therewith. A forth deficiency of existing solutions is that they use hierarchical data structures merely to predict a categorization (e.g. of an individual or other entity) and fail to utilize a hierarchical data structure to expose decisions/attributes of various entities that lead to one or more outcomes (e.g. a goal outcome) and further fail to utilize such hierarchical structures to generate one or more recommendations seeking to affect an outcome and steer an entity toward a goal outcome.

SUMMARY

The technology described herein addresses one or more of the aforementioned deficiencies of existing solutions. The technology described herein relates generally to predictive analytic methods and systems using data formatted according to a sentence model. In an exemplary embodiment, data about the usage of a website by members of the public is collected from a variety of sources and stored in sentence model format, then used in a prediction model to provide specific recommendations to an owner or manager of the website to improve utilization of the website. In some embodiments, the system provides one or more recommendations for the completion of a stated, quantitative goal, and, for each recommendation, provides an estimate of percent completion of the goal that can be achieved by performing said recommendation.

The sentence model allows for the collection of data from disparate data sources to be used for the data analysis while providing a universal way for the collecting and storing of that data that is quick to implement with existing legacy systems and data format, and is extendable to capture many different kinds of information without being limited to a specific domain.

In addition, the data formatted in a sentence model can serve as an 'atomic unit' of information to be efficiently employed in an analysis. To this end, algorithms can be implemented such that native function calls that are optimized for a given framework can be leveraged to search and query the information unit without, for example, having to parse through multiple information content that exists in a given data entry of a given legacy system.

The technology described herein further relates to the efficient storage and analysis of big data (e.g., for predictive analytics, modeling, machine learning, and/or data mining) by storing and operating on such data as string objects within a data array, which is used as input for the data analysis. The technology increases the density of information in the data array such that the analysis operation can be performed, in many instances, entirely within the volatile memory of the system performing the analysis. The data are then searched by native function calls that are optimized for efficiency and speed. To this end, vast amounts of data can be efficiently stored and retrieved, via volatile memory, when performing computational intensive operations, such as during the generation and/or implementation of a prediction model.

The technology further pre-processes the data, e.g., by folding similar data together and filtering irrelevant data, to allow the data to operate within this optimized window of operation.

To this end, the technology reduces the cost of obtaining useful information from big data such that the benefit becomes economically viable to new customer segments, such as small and medium business owners. The technology also reduces the cost of operation for companies already employing big data analysis.

As indicated, the disclosed technology, in an exemplary embodiment, enables a system that provides one or more recommendations for the completion of a stated, quantitative goal, and, for each recommendation, provides an estimate of percent completion of the goal that can be achieved by performing said recommendation. In a test, it was observed that a system employing an embodiment of the disclosed technology predicted a negative action (e.g., that something will not happen) with over 95 percent accuracy and predicted a positive action (e.g., that something will happen) with nearly 55% accuracy.

In addition, rather than tracking immediate conversions (e.g., observed actions of the user/visitor of the website), which may not necessarily lead to the desired goal, the present technology allows for the measurement and tracking of the activity and its correlation to the end goal. In being able to quantitatively correlate an observed action with an effect of a stated end goal provided by a manager/owner of a website, the system gives the owner/manager earlier notice about whether a given action is effective in achieving said goals, whether a given campaign is on track to meet its desired goal, and/or whether more action or effort is necessary to attain the stated end goal.

It is contemplated that the present technology can be employed with various predictive analytics, modeling, machine learning, and/or data mining applications for a wide field of use (for example, in the field of website utilization, political campaign, energy or resource conservation campaign, retail marketing, among others).

According to one innovative aspect of the subject matter described in this disclosure, a system comprising: a processor; and a memory, the memory storing instructions that when executed cause the processor to: receive a goal, the goal associated with a predicate-object pair; receive via the processor, utilization data including a plurality of predicate-object pairs, the plurality of predicate-object pairs including the predicate-object pair associated with the goal; determine a prediction model comprising a plurality of nodes that form a hierarchical structure, the hierarchical structure including a root node and two or more leaf nodes, the two or more leaf nodes including a leaf node associated with the predicate-object pair of the goal, and wherein the plurality of nodes are organized within the hierarchical structure based, at least in part, on one or more of an information gain and a business gain; identify one or more nodes in the hierarchical structure that trace a path from the root node to the node associated with the predicate-object pair of the goal; and cause one or more recommendations for at least partial completion of the goal to be presented to a user, the one or more recommendations based on the predicate-object pairs corresponding to the one or more nodes that trace the path from the root node to the node associated with the predicate-object pair of the goal.

A method comprising: receiving, via a processor, a goal, the goal associated with a predicate-object pair; receiving, via the processor, utilization data including a plurality of predicate-object pairs, the plurality of predicate-object pairs including the predicate-object pair associated with the goal; determining, via the processor, a prediction model comprising a plurality of nodes that form a hierarchical structure, the hierarchical structure including a root node and two or more leaf nodes, the two or more leaf nodes including a leaf node associated with the predicate-object pair of the goal, and wherein the plurality of nodes are organized within the hierarchical structure based, at least in part, on one or more of an information gain and a business gain; identifying, via the processor, one or more nodes in the hierarchical structure that trace a path from the root node to the node associated with the predicate-object pair of the goal; and causing, via the processor, one or more recommendations for at least partial completion of the goal to be presented to a user, the one or more recommendations based on the predicate-object pairs corresponding to the one or more nodes that trace the path from the root node to the node associated with the predicate-object pair of the goal.

Other aspects include corresponding methods, systems, apparatus, and computer program products. These and other implementations may each optionally include one or more of the following features.

For instance, the features further include the utilization data including a plurality of predicate-object pairs comprises data from heterogeneous data sources converted into a plurality of sentences, a sentence comprising: a subject element identifying an entity; and a predicate-object pair including a predicate element describing an action of the entity in relation to an attribute, the attribute described by an object element.

For instance, the operations further include filtering, via the processor, one or more predicate-object pairs of the plurality of the utilization data such that the filtered predicate-object pairs are not used to determine the prediction model, wherein the filtering is based on one or more of (i) a number of subject elements having a given predicate-object pair, said predicate-object pair being allowed to be used when the predicate object pair is determined to be used by at least a pre-defined number of subject elements, and (ii) on a time value associated with the creation of the sentence of the filtered predicate-object pair.

For instance, the operations further include generating, via the processor, a data array from the utilization data, the data array comprising a plurality of entries, each entry comprising a given subject element and one or more predicate object pairs corresponding to the given subject element, the one or more predicate-object pairs of a given entry stored together as a single string object, and wherein each of the one or more predicate-object pairs in the single string object are represented by a numeric symbol, wherein each of the plurality of nodes is associated with a numeric symbol associated with a predicate object pair.

For instance, the features further include the plurality of nodes are organized within the hierarchical structure based, at least in part, on one or more of an information gain and a business gain are organized at least in part based on one or more of (i) a frequency that a given predicate-object pair with which a given node is associated appears in the utilization data and (ii) a frequency that a given predicate-object pair with which the stated goal is associated appears in the utilization data, wherein a frequency of a given predicate-object pair is determined based on an evaluation of the string objects using a native string function call within one or more of a .Net and Java framework.

For instance, the features further include one or more of generating the data array and determining the prediction model is performed in a volatile memory.

For instance, the operations further include casting, as a char data type, integer-based data type selected from the group consisting of a unsigned short integer (ushort), a short integer (short), an integer (int), an unsigned integer (uint), a long integer (long), and an unsigned long integer (ulong).

For instance, the operations further include folding, via the processor, two or more predicate-object pairs of the utilization data to form a folded predicate-object pair such that the folded predicate-object pair is used to determine the prediction model and such that the two or more predicate-object pairs used to generate the folded predicate-object pair are not associated with individual nodes.

For instance, the features further include the folded predicate-object pair comprises a common predicate element and, as the object element, a common portion of a URL or URI address.

For instance, the features further include the root node is associated with a lowest entropy.

It should be understood that the above is not all-inclusive and many additional steps, features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE FIGURES

The following figures are presented for the purpose of illustration only, and are not intended to be limiting.

FIGS. 2A-2C illustrate exemplary data formats of text data, application data, relational database data, and XML data generated from disparate data sources. FIG. 2A illustrates an example text data of a server log that indicates some sort of usage or activity of a website by customers of the website (e.g., visits made by users to a website). FIG. illustrates an example of a relational database data outputted from a relational database. FIG. 2C illustrates an example of XML data.

FIG. 3 illustrates the exemplary data of FIGS. 2A-2C formatted according to a sentence model.

FIG. 4 illustrates an exemplary sentence model data with meta-information of the data.

FIG. 8 is an example data array formatted as string objects.

FIGS. 9A-9H illustrates a method of generating a decision tree.

All publications, patent applications, patents, and other references mentioned herein, are incorporated by reference in their entirety. In case of conflict, the present specification, including definitions, will control. In addition, the materials, methods, and examples are illustrative only and not intended to be limiting. Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. Other features and advantages of the invention will be apparent from the following detailed description, and from the claims.

DETAILED DESCRIPTION

The disclosed technology relates generally to methods and systems of predictive analysis that format big data according to a sentence model that allows for the data to be efficiently collected and stored from disparate sources, and analyzed and operated upon as sentences having a common format. When working with large amounts of data that come from disparate sources and are in different formats, it is extremely challenging to automate the analysis of the data. For example, consider data sets of (a) Website visits that are tracked in the form of server logs, (b) user information that are stored in a customer relationship management (CRM) system, e.g., salesforce, (c) a spreadsheet of a list of conference attendees maintained by the conference organizers, and (d) vehicle operation information stored in an embedded database of the vehicle. To achieve a meaningful and holistic analysis, one needs to come up with a way to represent such disparate data in a common format amenable to automated analysis.

Human language meets this need. It is universal, almost everyone can use it and understand it, and it is able to convey many types of information without being limited to a specific domain. The sentence model described herein employs syntactic rules of natural language and interprets data as instances of sentences, each including a subject element, a predicate element, and an object element.

In some implementations, the sentence model can be extended by expressing the predicate element in passive voice. This allows for more complex analysis to be employed without complicating the storage model. Take the following example into consideration: "User 1 has bought Product 1"; "Product 1 was associated with Product 2."; User 2 has bought Product 1"; and "User 2 has bought Product 2." The sentence model not only allow actions of users to be analyzed, but also relationships between different objects reflected by the actions that the subjects have performed.

Figure 1:
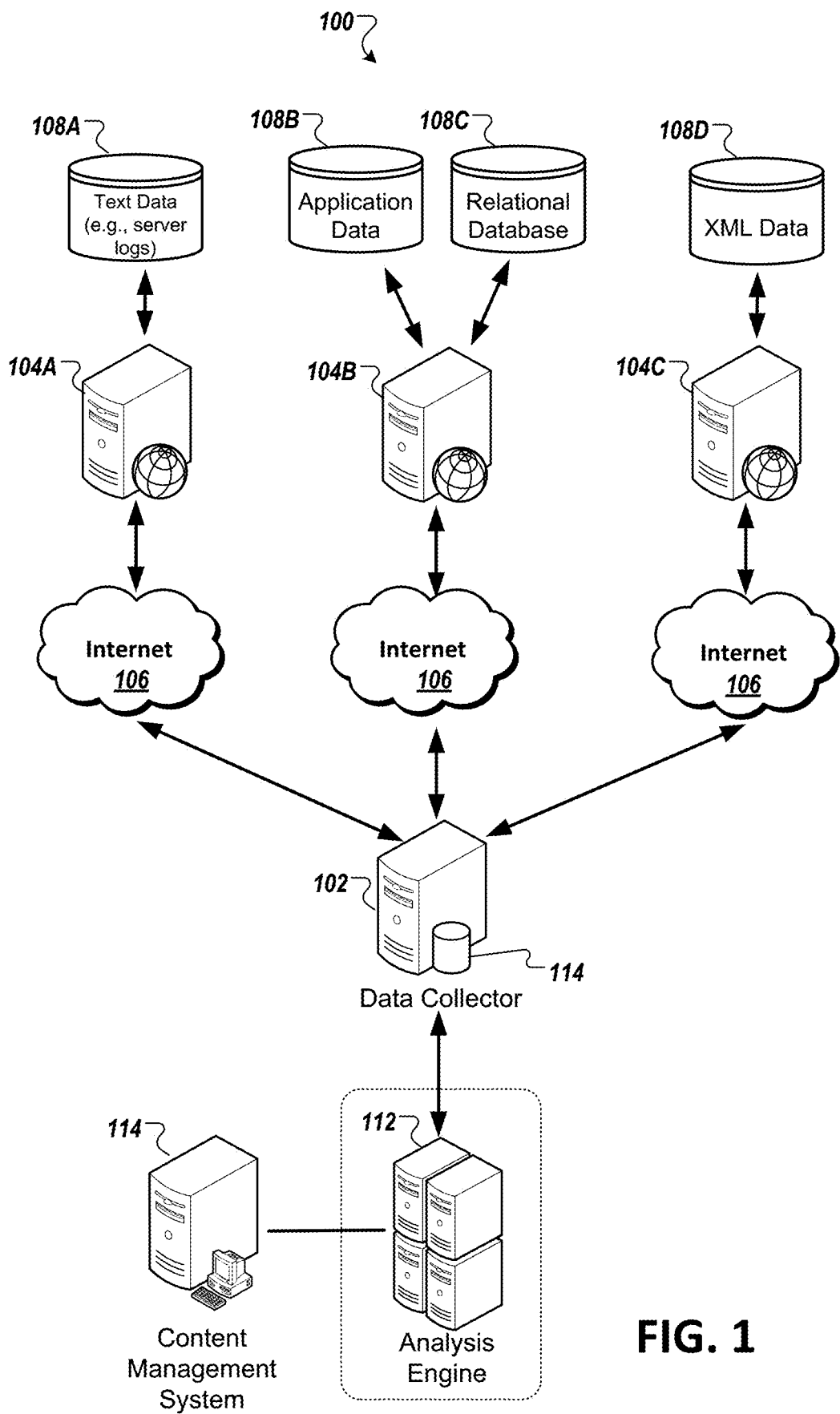
FIG. 1 shows an illustrative system for collecting and operating on data formatted according to a sentence model.

FIG. 1 shows an illustrative system 100 for collecting and operating on data 101 formatted according to a sentence model. The system 100 includes a data collector 102 that is operatively linked to a plurality of heterogeneous data sources 104*a-c* through a network 106. In some embodiments, the data collector 102 is a cloud-based system (e.g., hosted on Azure). The data sources 104 provide data 108A-108B to the data collector 102 to be analyzed for predictive analysis by the system 100. In some embodiments, the data 108 includes textual data 108*a*, application data 108*b*, relational database data 108*c*, and XML data 108*d*. The data sources 104*a-c*, in some implementation, is loaded and configured with a software development kit (SDK) to convert legacy data or natively generated and stored data to a sentence data. The SDK may include an application programming interfaces (APIs) that provides pre-defined rules for converting such legacy and native data to the sentence data.

Examples of the data sources 104*a*-104*c* include a content management system, a customer relationship management (CRM) system, an enterprise resource planning (ERP) system, among others. The data collector 102, in some implementations, directly interface with the CMS that manages and tracks utilization of websites. In another embodiment, the data collector 102 collects the data through connector with the CRM and ERP systems (e.g., SalesForce, Microsoft Dynamics, and Marketo). In another embodiment, the data collector 102 interfaces to data sources 104*a*-104*c* operating a JavaScript, .NET, or iOS SDKs. In another embodiment, the data collector 102 interfaces to data sources 104*a*-104*c* that is instrumented using HTML5 declaratives. In another embodiment, the data collector 102 interfaces to legacy databases (e.g., SQL Server, Oracle, Everlive, among others).

Depending on the format of the source data (namely, the pre-converted data), the data sources can convert a given instance of the source data 108*a*-108*d* to multiple sentences. To this end, each instance of the data 108 of the data sources 104*a*-104*c* may be provided as one or more sentence data 101 to the data collector 102. The conversion thus serves to normalize the data and, in some instances, reduce the information content within the source data to an information unit that can be quickly analyzed by the analysis system. The sentence data 101 is preferably expressed in simple-sentence structure having a subject, predicate, and object, though can be extended to other types of sentence structures as well.

Once the data is collected, the analysis system 112 may analyze the data with relation to a goal received an owner/manager of a website. In some embodiments, the user of the recommendation system (e.g., the website owner or manager) is able to set goals (step 504) via an interface of a content management system for the website. In some implementation, the goal is associated with a predicate-object pair, where the predicate-object pair includes a given predicate element and a given object element. Any of the logged or collected sentences from the collected data (e.g., a predicate-object pair of a given sentence in the collected data) can thus serve as a goal. Examples of goal may be "has bought product X" or "has downloaded trial product Y."

The data 114 may be transmitted with meta-information of the data, including a timestamp value associated with the creation of the data and an identifier of the data source 104a-104c.

FIGS. 2A-2C illustrate exemplary data format of text data 108a, application data 108b, relational database data 108c, and XML data 108d generated from data sources 104a-c. The data 108a-108d include information represented in strings of characters that can be directly extracted from within a given data file or data stream or added as a description by an administrator of the data sources 104a-104c that is overseeing the data conversion.

FIG. 2A illustrates an example text data 108a of a server log that indicates some sort of usage or activity of a website by customers of the website (e.g., visits made by users to a website). To this end, the text data 108a includes data generated by a machine according to a pre-defined set of rules. A web log may, in some implementations, include a list 202 of pages 204 visited by a user and an associated timestamp 206 of the visit that is recorded by a web server. FIG. 2A shows two instances of a web log having a time stamp 206 (e.g., shown in year, month, day), a number entry 208, and a website uniform resource locator (URL) or uniform resource identifier (URI).

FIG. 2B illustrates an example of an application data 108b (e.g., information in a word processing file or spreadsheet file) and a relational database data 108c. FIG. 2B shows two instances of purchase data organized in a table form. Here, the table was extracted from a customer relationship management (CRM) system that organizes, automates, and synchronizes sales, marketing, customer service, and technical support of a website. The purchase data includes fields includes a "UserId" field 210, a Product field 212, a Date field 214, and a Price field 216 and represent each instance that a user has bought a product.

FIG. 2C illustrates an example of XML data 108d. XML data 108d may include data in mark-up notation (e.g., extensive mark-up language (XML) files or data stream or Javascript Object Notation (JSON) files or data stream). FIG. 2C shows example XML data having test drive information that is extracted from an onboard computing device of a car.

Collectively, the data 108a-108d provides vast amounts of information (in sentence model format) to the data collector 102 to be analyzed.

FIG. 3 illustrates the exemplary data of FIGS. 2A-2C formatted according to a sentence model. As shown, the data from the text data 108A, the relational database data 108C, and the XML data 108D are normalized to a single data format. The data in sentence model format can be subsequently retrieved from predictive analysis and machine learning applications and can be applied on a wide variety of data.

The data source 108b may apply pre-defined rule to deconstruct the text data to generate sentences of the text data. These rules may be invoke, in some implementations, through APIs within a SDK application.

As shown in FIG. 2A, for example, the text data file or data stream includes text objects organized according to a pre-defined scheme. Here, the body of the text file 202 includes a plurality of entries, in which each entry have a time stamp, a counter value, and a logs of URL that have been visited by a given user. The information associated with the identity of the user may be located in the header information of the text file or in the file name.

Here, the sentence may be generated from text object such that the text within the body of the file (e.g., the logs of URL) is mapped as an object element of the sentence model. The metadata information (e.g., user or device identifier in the file header or file name) may be mapped as a subject element, and a description of the file (e.g., "has visited") may be mapped as a predicate element.

Referring to FIG. 3, the text data 202 of FIG. 2A is shown converted to two sentences data 302 and 304, in which the first entry 302 includes a "User 01" as a subject element, "has visited" as a predicate element, and "/about-us" as an object element. The second sentence 304 has a subject element of "User 02", a predicate element of "Has visited", and an object element of "/products/mustang."

Relational database data 108c may be converted using the relation information in the database entry. Fields or tuples within a relational database, for example, may be directly mapped to the sentence elements. As shown in FIG. 3, the relational database data 108c is converted to two sentences data 306 and 308, in which the third entry 306 includes a "User invd54" as a subject element, "has bought" as a predicate element, and "Ford Mustang" as an object element and in which the fourth sentence 308 has a subject element of "User Fgb22", a predicate element of "Has bought", and an object element of "Ford F150". For a given entry in the relational database, an element in the database is mapped to a given sentence element. Thus, more than one sentence may be generated for a given entry.

XML data 108d may be converted using attribute or notation information within the annotated data structure. Attributes and value pairs in the markup language (e.g., in xml) may be directly mapped to a sentence in which the content object of an attribute-value pair is mapped as subject elements and the attribute is mapped as predicate element. The subject element may be identified based on a specific content value of one of the attribute-value pair. As shown in FIG. 3, the XML data 108d is converted to three sentence data 310, 312, and 314 in which the fifth entry 310 includes a "User Ivan Osmak" as a subject element, "Has test driven" as a predicate element, and "Ford Mustang" as an object element; the sixth sentence 312 has a subject element of "User Ivan Osmak", a predicate element of "Has listened to", and an object element of "Paint It Black"; and the seventh sentence 314 has a subject element of "User Ivan Osmak", a predicate element of "Has a top speed of", and an object element of "95".

Figure 5:
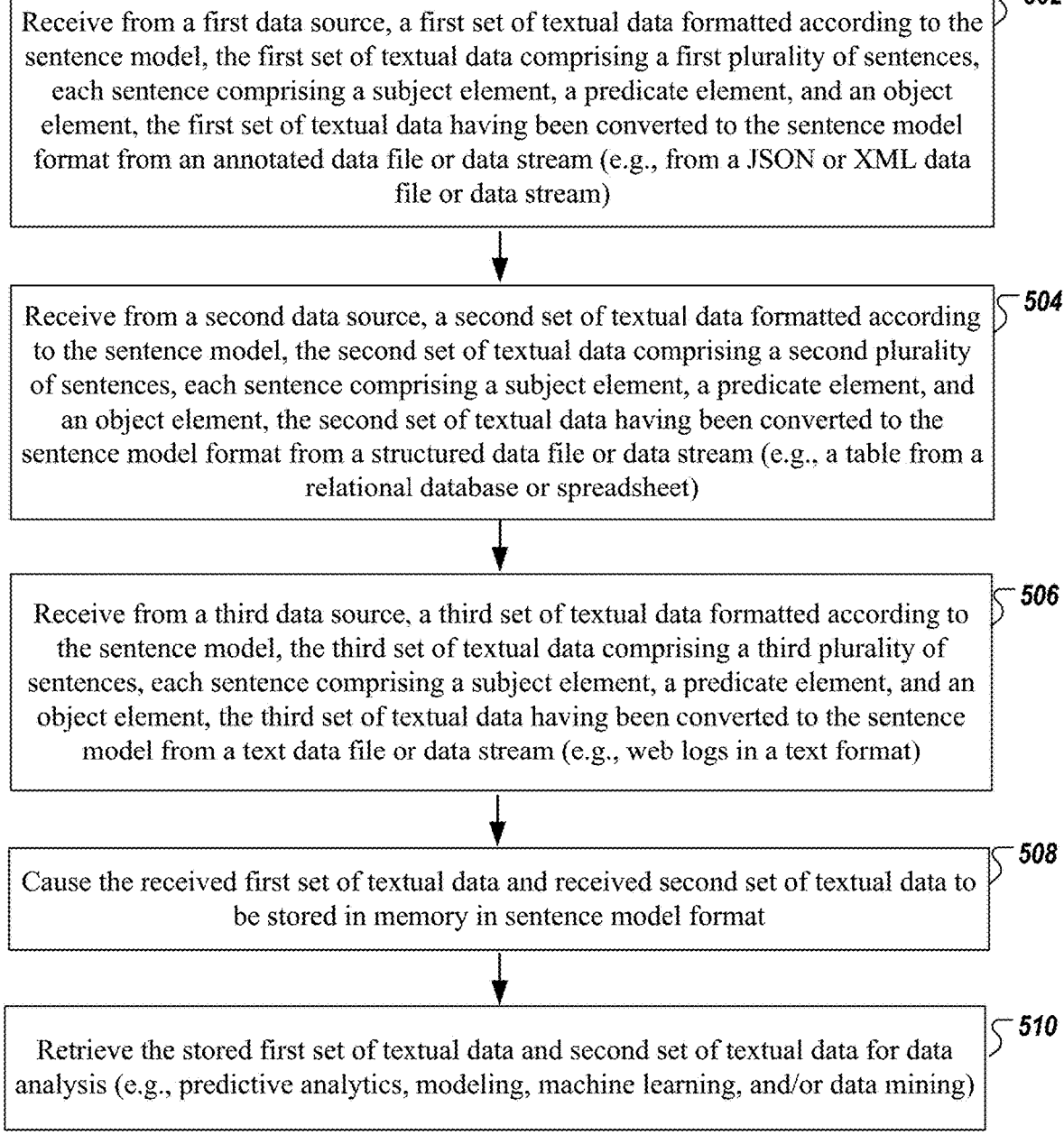
FIG. 5 shows an exemplary method for collecting sentence data to be used for data analysis.

FIG. 5 shows an exemplary method for collecting data to be used for data analysis. The system receives, from a first data source, a first set of textual data formatted according to the sentence model (step 502); receives, from a second data source, a second set of textual data formatted according to the sentence model (step 504); and receives, from a third data source, a third set of textual data formatted according to the sentence model (step 506). The received first, second, and third sets of textual data stored in memory in sentence model format (step 508) and retrieved subsequently for data analysis (e.g., predictive analytics, modeling, machine learning, and/or data mining) (step 510).

The first set of textual data, in some implementation, includes a first plurality of sentences, which have been converted (e.g., using APIs with pre-defined rules for the conversion) from an annotated data file or data stream (e.g., from a JSON or XML data file or data stream). As shown in FIG. 2C, XML data 108d includes data in mark-up notation (e.g., extensive mark-up language (XML) files or data stream or JavaScript Object Notation (JSON) files or data stream). One or more content objects of the annotated data file or data stream, in some implementations, can be directly mapped as subject elements and object elements of the sentence model, and one or more markup constructs corresponding to the one or more content objects can be directly mapped as predicate elements of the sentence model.

The second set of textual data, in some implementation, includes a second plurality of sentences, which have been converted (e.g., using APIs with pre-defined rules for the conversion) from a structured data file or data stream (e.g., a table from a relational database or spreadsheet). As shown in FIG. 2B, the structured data file (e.g., relational database data 108c) includes content objects organized by attribute values in a table format. One or more content objects of the structured data file, in some implementations, can be mapped as subject elements and object elements of the sentence model, and one or more attribute values corresponding to the one or more content objects of the structured data file or data stream can be mapped as predicate elements of the sentence model.

The third set of textual data, in some implementations, includes a third plurality of sentences, which have been converted from a text data 108a. The text data file or data stream include text objects organized according to a pre-defined scheme. As shown in FIG. 2A, the body of the text file 202 includes a plurality of entries, each entry having a time stamp, a counter value, and a logs of URL that have been visited by a given user. A text object within the body of the file, in some implementations, can be mapped as an object element of the sentence model. Metadata information (e.g., user or device identifier), for example, in the header of the file or the file name, can be mapped as a subject element and/or predicate element. In some implementations, the subject element and/or predicate element can be added as a label provided by a user (e.g., an administrator) of the data source system.

In some implementations, the sentence model data 101 are transmitted with meta-information of the data, including a timestamp value associated with the creation of the data and an identifier of the data source 104a-104c.

FIG. 4 illustrates an exemplary sentence model data 101 with meta-information of the data. The sentence model data 101 (namely, the subject element, the predicate element, and the object element) are formatted as a string of characters. The meta-information includes an identifier 402 of the data source. This information is preferably a string of character. The metal5 information may include a time stamp value 404 that is associated with the information in the sentence data or the creation of the sentence model data 101. The data source and time stamp information may be used to identify the source of the sentence data and in the filtering of such data in subsequent analysis.

Data sources 104a-104c provide the principal sources of information for the decision tree calculation. In some embodiments, all information that gets into analysis system are attributed with a data source to allow for the determination of the origin of the data.

In some embodiments, the information enters the system in the form of sentences, in which a raw sentence is a quintuple consisting of: (DataSource, Subject, Predicate, Object, Timestamp). Expressed in natural language, the sentence would read 'From information source 25 X we know that Subject did Predicate with Object at time Timestamp'. Thus, the subject element identifies a client and the predicate element gives us an action that was performed. Additionally, the object element can be given as the value of the action; typically an URL or other information whose interpretation depends on the predicate element. An example of a raw sentence is provide in Table 1.

TABLE 1

Example of a raw sentence with metadata ('CRM', '1234567', 'has bought', 'Enterprise', '2014-08-15T22:49:00')

TABLE 2

Example of a raw sentence with metadata ('Sitefinity', '198A-678B-056D-819298F3', 'has visited', 'http://sitefinity.com/about.aspx', '2014-08-15T22:50:11')

In some implementations, metadata information relating to the source of the text data may be employed to identify the user, which is thus mapped to the subject element. Metadata information or fields may be employed to map to predicate objects. It is found that metadata information, field information, header information is typically a source of the subject and predicate elements while the body of the text file or data stream is a typical source for the object element.

An exemplary application of the sentence model data for predictive analytics is now described. Referring still of FIG. 1, the system 100 includes an analysis system 112 that provides a predictive analytics solution for digital marketing. The system 112 provides a solution that is optimized to the customer's journey to increase the return-on-investment (ROI) of various marketing activities of a website. The analysis system 112 may operate with conjunction with a content management system 114 that manages and tracks a hosted website.

Website Utilization and Recommendation System

Figure 6:
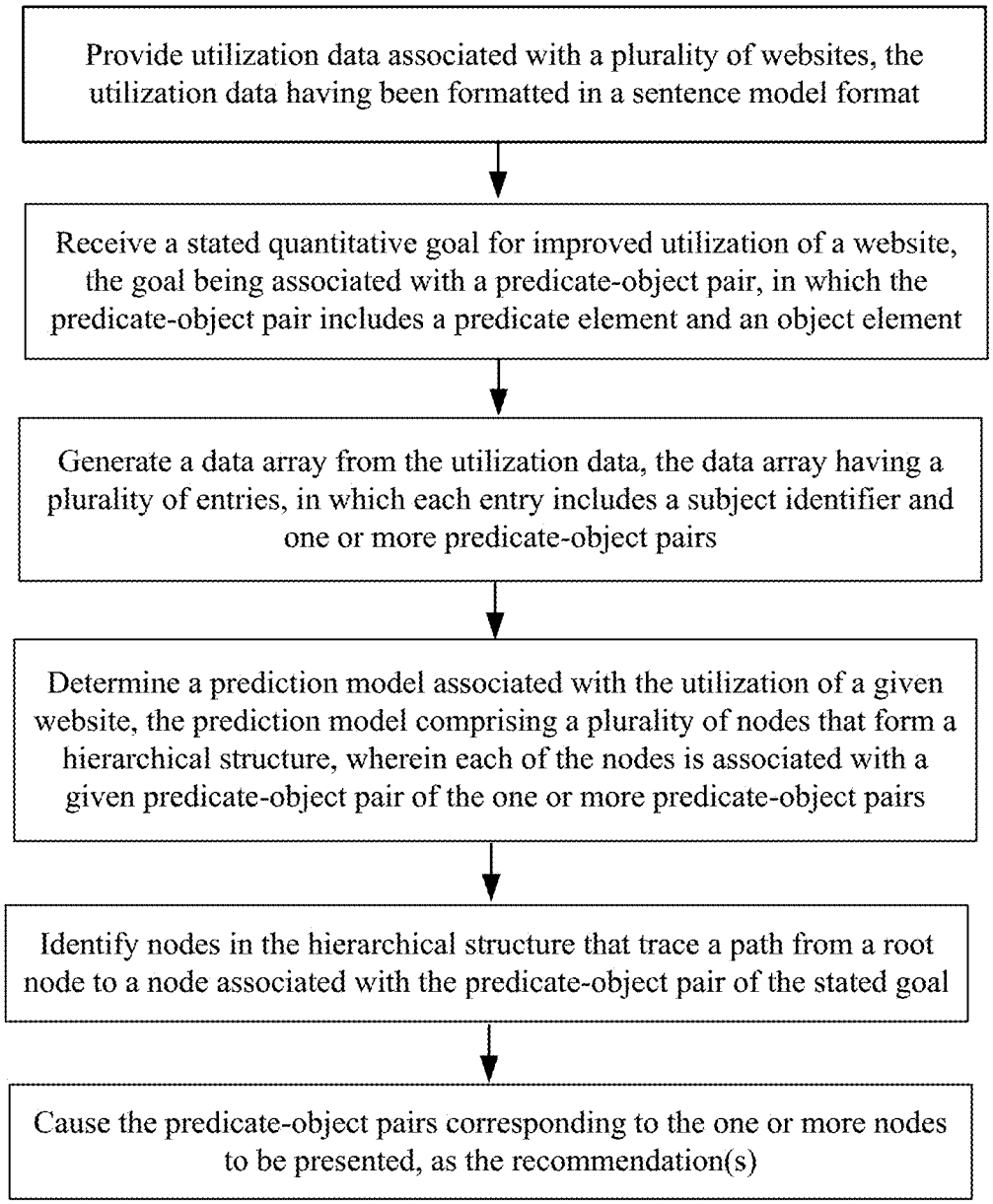
FIG. 6 shows an exemplary method for analyzing sentence data to provide recommendations to an owner or manager of a given website to improve utilization of the given website.

FIG. 6 shows an exemplary method for analyzing sentence data to provide recommendations to an owner or manager of a given website to improve utilization of the given website. The method may, for example, provide one or more recommendations for completion of a stated, quantitative goal, and, for each recommendation, provide an estimate of percent completion of the goal that can be achieved by performing said recommendation.

The system 112 provides, via a processor of a computing device, utilization data associated with a plurality of websites in which the data have been formatted in a sentence model format (step 602). Each of the utilization data includes a number of sentences, in which each includes a subject element, a predicate element, and an object element. The subject element identifiers a user (e.g., visitor or customer) of a website. The predicate and object element, together forms a statement describing an action (e.g., having visited, having bought, having downloaded, etc.) of the given user (e.g., website user/visitor) in relation to an attribute of the website (e.g., a webpage, a product, etc.).

Once the goal has been defined (step 604), the system 112 executes a decision tree algorithm to create a mathematical model of the microsegments that lead to desired goal (step 606). In essence, the system mathematically reverse engineers the success criterion. In some embodiments, the system 112 generates a data array from the utilization data (step 604).

Figure 12:
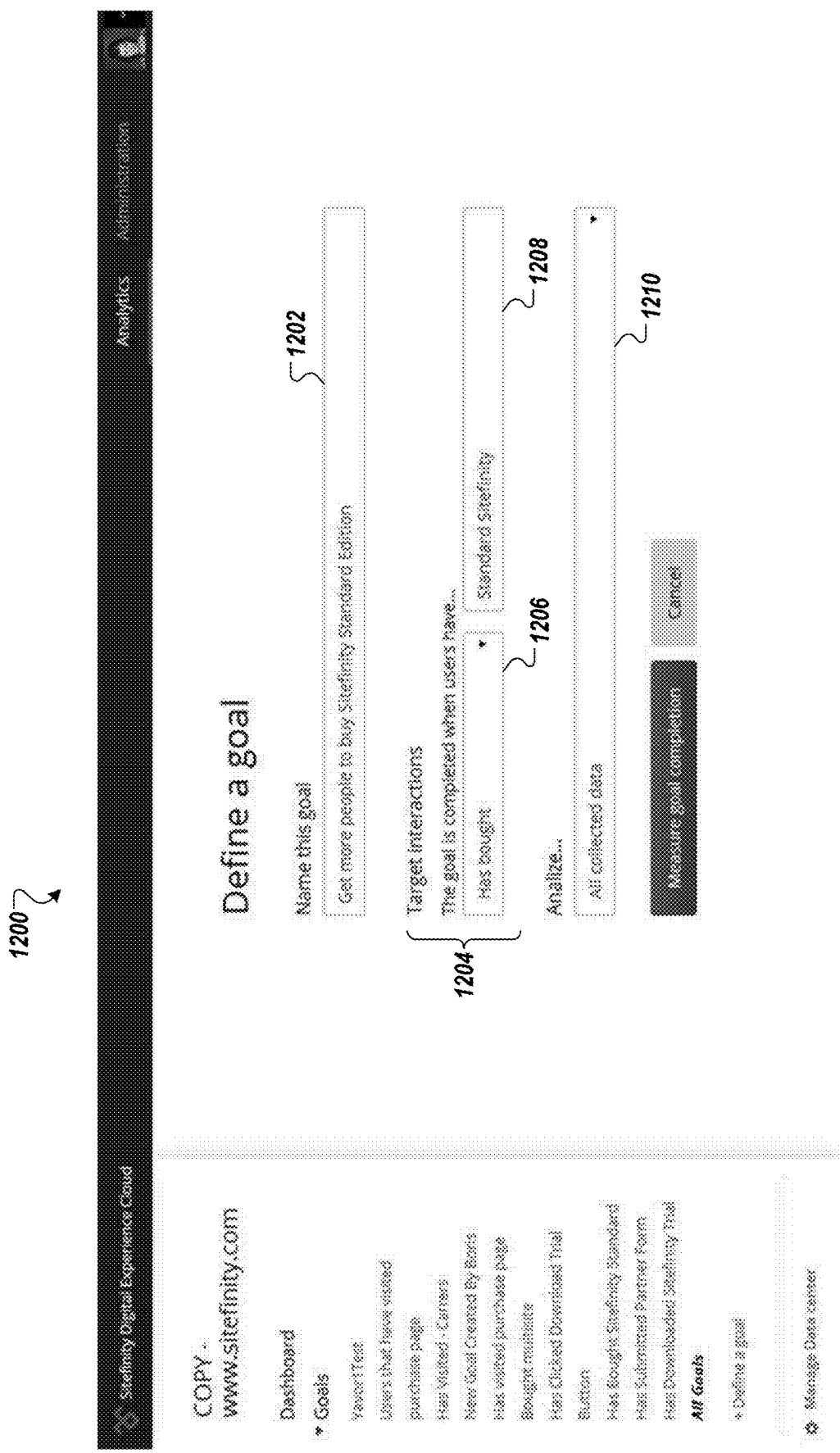
FIG. 12 is an exemplary graphical user interface for receiving a quantitative goal from a website owner or manager.

FIG. 12 is an exemplary graphical user interface for receiving a quantitative goal from a website owner or manager. As shown, the interface 1200 receives a goal 1202, which is associated with a predicate-object pair. The goal also includes a target 1206 to which the system can track progress. In some embodiments, the interface allows the website manager or owner to specify the data 1210 to be used in the analysis.

The data array includes a plurality of entries, each entry comprising a subject identifier and one or more predicate-object pairs corresponding to the subject identifier. In the data array, the subject identifier corresponds to the subject element of a given sentence of the utilization data and each of the one or more predicate-object pairs corresponds to the predicate element and the object element of the given sentence of the utilization data. To the end, the data of the sentence model can be directly imported into the data array.

The analysis system 112 then determines a prediction model (e.g., iterative dichotomiser 3 (ID3) decision tree model, C4.5 decision tree model, or binary decision tree) associated with the utilization of a given website (step 608). The prediction model includes a plurality of nodes that form a hierarchical structure. Each of the plurality of nodes is associated with a given predicate-object pair of the one or more predicate-object pairs, and the plurality of nodes are organized within the hierarchical structure based, at least in part, on an information score derived from (i) a frequency that a given predicate-object pairs with which a given node is associated appears in the data array and (ii) a frequency that a predicate-object pair with which the stated goal is associated appears in the data array. The sentence data serves as training data for the prediction model. It was observed that the system is able to get up to 97% accuracy in predicting negatives (that something won't happen) and around 60% accuracy in predicting positives (that something will happen).

Description of the ID3 decision tree model may be found in J. R. Quinlan, "Induction of Decision Trees," 1, 1 Mach. Learn. 81-106 (1986). Description of the C.45 algorithm may be found in J. R. Quinlan, "C4.5: Programs for Machine Learning" Morgan Kaufmann Publishers (1993). The content of each of these references is hereby incorporated by reference in its entirety.

The system then identifies nodes in the decision tree that trace a path from a root node to a node associated with the predicate-object pair of the stated goal (step 610). A segment can be defined in as a path from the root node to sub-node. There are two types of segments: base segments and target segments. The base segment is described by a set of properties with their values. This segment is computable by a top-down path in the decision tree. The target segment is then understandable as a one-node extension to this path, so that the target segment becomes the base segment plus one added positive (non-false) DT node.

Figure 13:
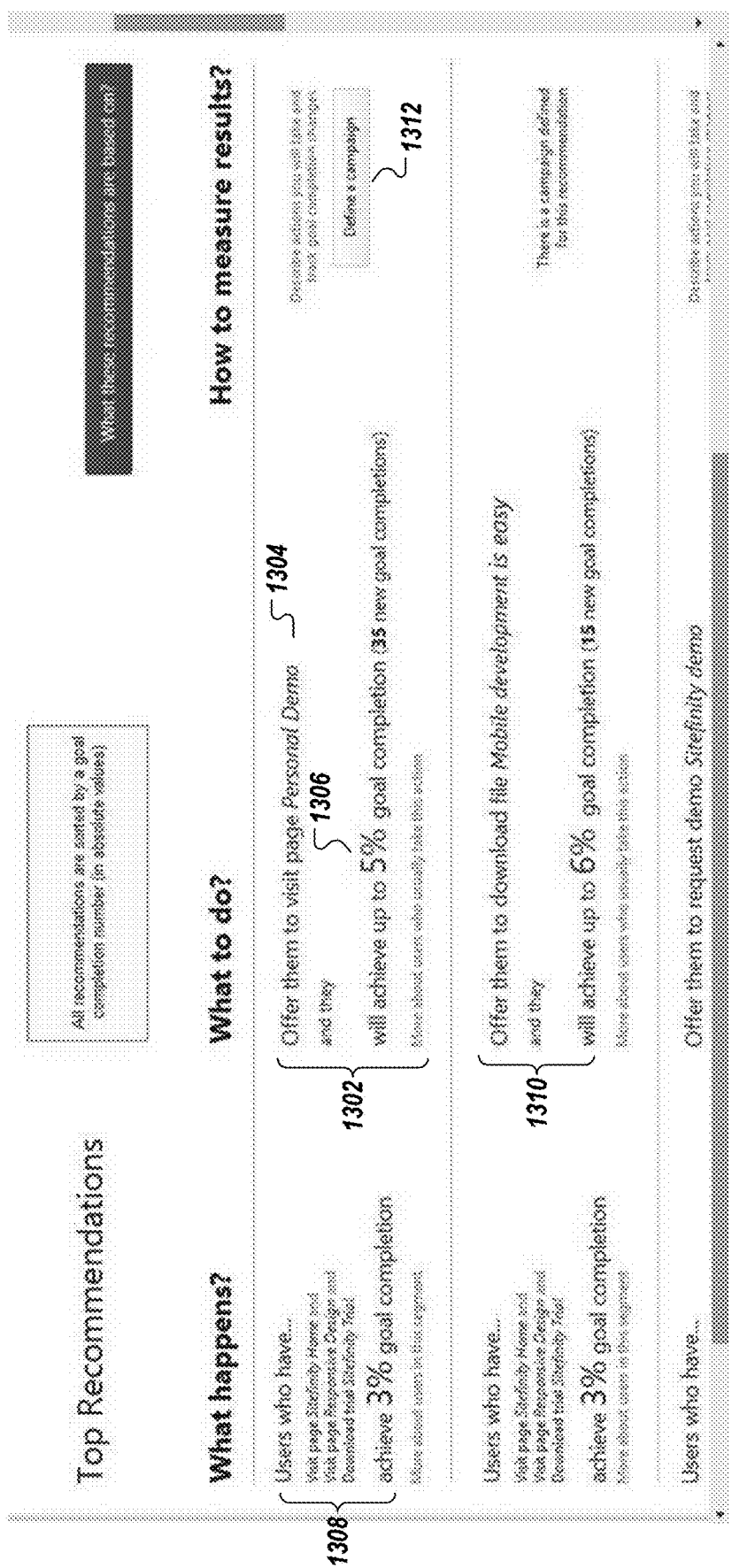
FIG. 13 is an exemplary graphical user interface for presenting recommendations to an owner or manager of the website to improve utilization of the website. The recommendations include an estimate of percent completion of the goal that can be achieved by performing said recommendation.

The predicate-object pair corresponding to the nodes in the identified path are then presented as recommendations (Step 612). FIG. 13 is an exemplary graphical user interface 1300 for presenting recommendations 1302 to an owner or manager of the website to improve utilization of the website. The recommendations 1302 includes an estimate of percent completion 1306 of the goal that can be achieved by performing said recommendation. The system determines a percentage of completion 1308 of a stated goal with respect to the stated target based on predicate-object pairs in the segments. In addition, the system presents recommendations 1302, which is a description derived from a predicate-object pair 1304 that, in some implementation, is found to effect the classification of the decision tree. The system further displays an estimated percent completion of the stated goal based on an expect impact from the recommendation normalized to the stated target.

Figure 14:
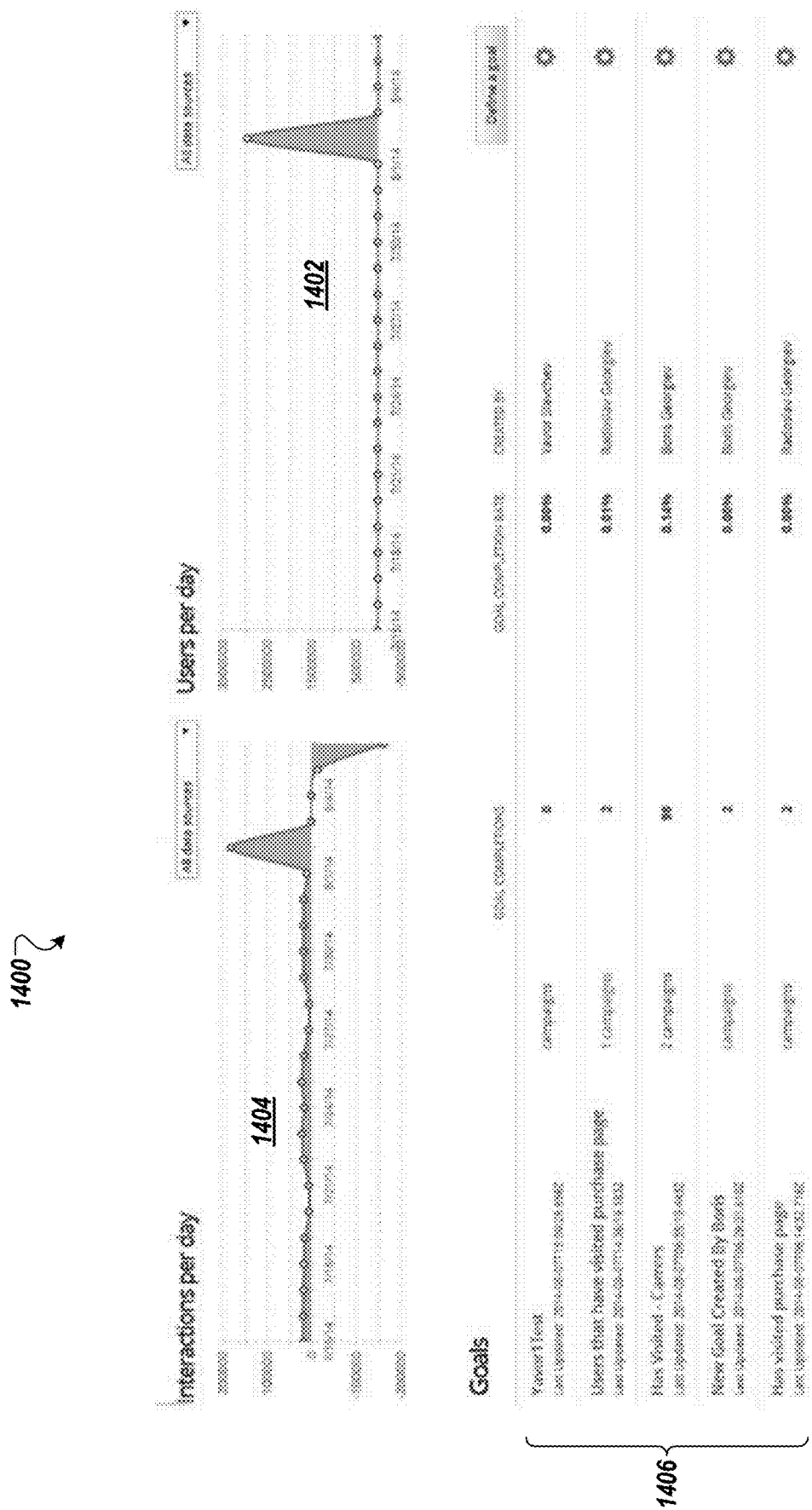
FIG. 14 is an exemplary graphical user interface showing a dashboard to manage and track goals.

FIG. 14 is an exemplary graphical user interface 1400 showing a dashboard to manage and track goals. The interface 1400 shows a plot 1404 of a number of daily interactions being recorded by the system. These interaction indicates a number of sentence data being generated. The interface 1400 also displays a plot 1402 of the number of users to the website. The dashboard further display a list 1406 of goals, the number of goal completions 1408, and the creator of the goals 1410.

Figure 15:
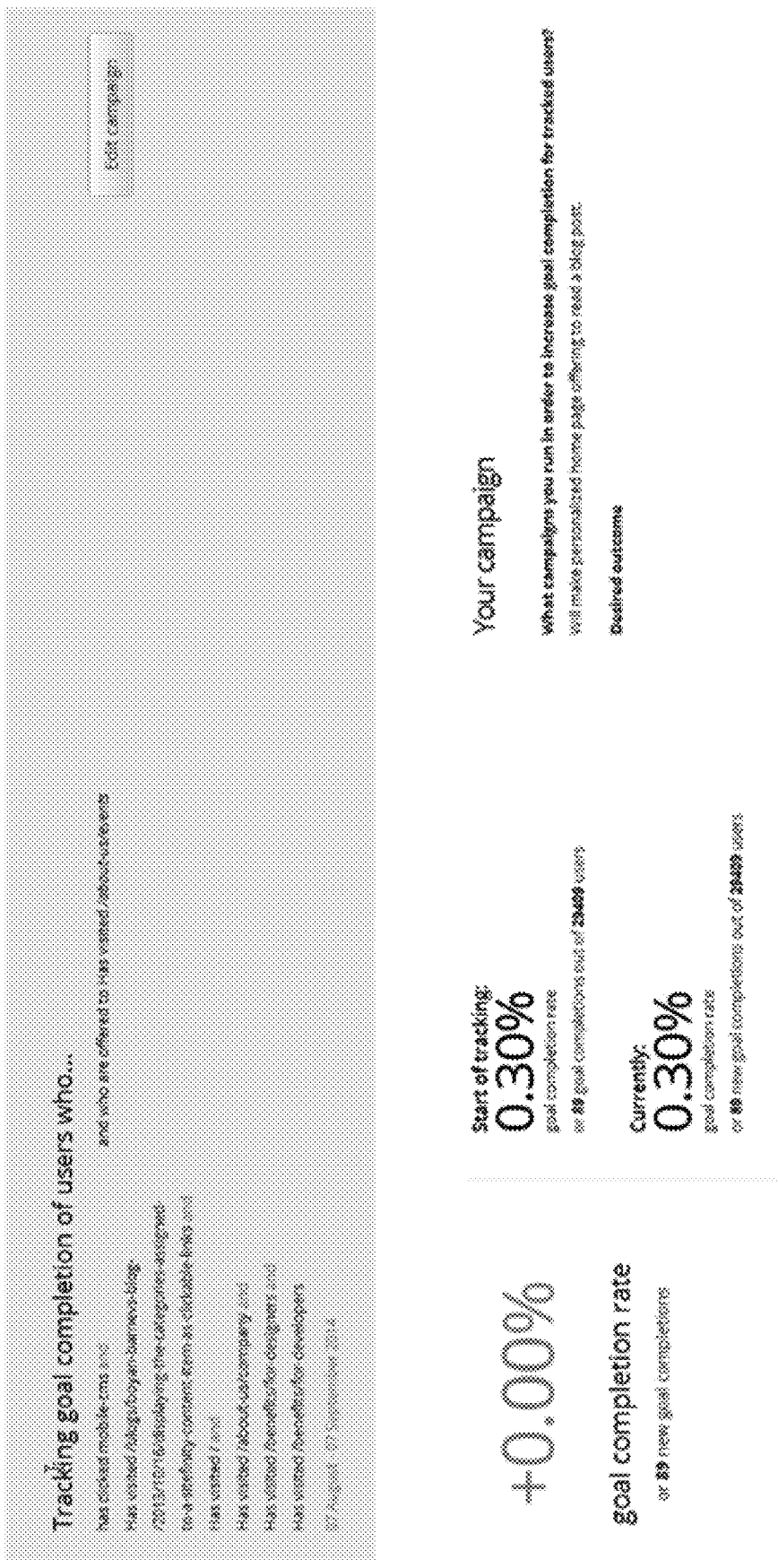
FIG. 15 is an exemplary graphical user interface showing details used in the tracking of a goal.

FIG. 15 is an exemplary graphical user interface 1500 showing details used in the tracking of a goal. The interface 1500 shows a list of properties 1502 that are found to be statistically significant in achieving the stated goal based on the identified segment of the decision tree. The interface 1500 also provides a starting completion rate 1504 and a current completion rate 1506 in meeting the stated target of the stated goal.

Figure 16:
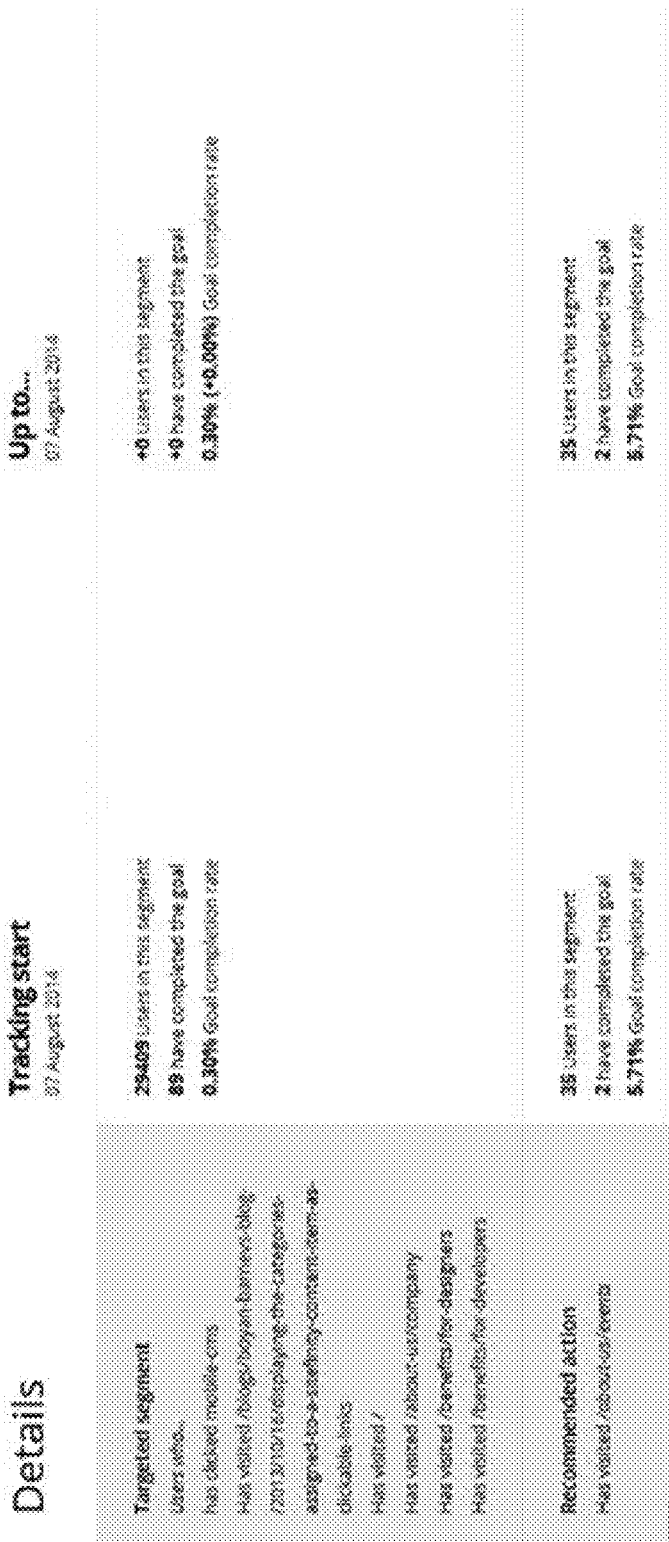
FIG. 16 is an exemplary graphical user interface showing historical details of a given campaign in relation to the completion of a goal.

FIG. 16 is an exemplary graphical user interface 1600 showing historical details of a given campaign in relation to the completion of a goal. The interface 1600 includes the actual completed goals 1602 that is used in calculating the completion percentage 1604.

Efficient Storage and Computation of Big Data Using String Objects

The disclosed technology further relates to the efficient storage and computation of big data (e.g., for predictive analytics, modeling, machine learning, and/or data mining) by storing and operating on string objects within the data array used as input to the data analysis. Deriving a decision tree pose several implementation challenges. Storing all properties for all clients (e.g., users and visitors of a website) can be challenging if there are, for example, 100,000 properties and 5 million clients; even if they are sparsely set. In addition, the created decision tree can have a big depth, making it impractical for future use and human interpretation. The created tree can be totally imbalanced as this is not a building criterion. In addition, the leaf nodes will potentially have not many clients in them, and might have limited value for practical purposes. This is sometimes referred to as overfitting. In addition, the information gain of a certain node can be miniscule and be not worth the computation effort.

Decision trees are a means of machine learning. The input to a decision tree can be thought of as a huge sparse matrix in which each row represents an entity, and each column represents a property. The entity may be an abstraction for a client, and properties represent information the client has given (like email address) or information that was collected for this client (e.g. browser type). One of the properties will be called the classification. A typical classification is the purchase type (e.g. enterprise, standard, add-on, support, consulting), but it could also be any property with discrete values. An example of a matrix for a small dataset is shown in FIG. 9A. An example of the a spare matrix stored with string objects is shown in FIG. 8. In both FIG. 8 and FIG. 9A, the matrix are shown populated with an integer representing a predicate-object pair.

The principal idea of decision trees is to find a (short) set of properties and their values so that the value of the classification can be reliably calculated. By using this set of properties, the system 112 can estimate the classification of otherwise unknown clients. In general, the classification will be a property with multiple discrete values; but the system can also employ binary/boolean values. The decision tree is a real tree of properties, built up in a recursive manner. Each node in the tree, in some implementation, is attributed to a histogram.

A histogram is a set of "name=count" pairs. A typical histogram would be like ("Standard"=1, "Enterprise"=3, "Add-On"=2). This could for example represent a situation where one client had bought a "Standard" edition, three other clients had bought an "Enterprise" edition and two others had bought an "Add-On". The interpretation of the value pairs depends on the chosen classification property. Any property of a client (i.e., a predicate-object pair) with discrete values may be employed as classification property.

With a given histogram, a numeric value can be calculated, for example, based on Entropy. According to information theory, entropy is a measure of the uncertainty in a random variable. For a binary histogram (i.e., a histogram with only two possible name or count pairs, e.g., N=3 P=5, entropy can be expressed by Equation 1.

$$H = -\sum_{k=0}^{n} (P_k \log_2 P_k) \text{ where } P_O = \frac{P}{N+P} \text{ and}$$

$$P_1 = \frac{N}{N+p}, \text{ and } n = 1$$

(Equation 1)

The entropy can also be calculated for non-binary histograms like (A=2 B=9 C=3 X=1) using Equation 1. The entropy (i.e., uncertainty) is biggest when (P=1 N=1) (maximum uncertainty) and lowest for (N=1 P=0) or (N=0 P=1) (i.e., no uncertainty).

To compare two histograms, the system, in some implementation, uses the difference between two entropies (to have a measure of the difference in uncertainty). In the decision tree calculation, this entropy is scaled to the expected number of clients according to Equation 2, often referred to as Information Gain.

$$IG(A,S) = H(S) - \Sigma_{\tau \in T} P(\tau) H(\tau)$$

(Equation 2)

where H(S) is the entropy of set S, T is a subset created from splitting S by attribute A such that
$S = U_{\tau \in T} \tau$, p(t) is a proportion of the number of elements in t to the number of elements in set S, and H(t) is the entropy of t. Thus, the system compares the abstract difference in entropy (which might be based on a small amount of data or a large amount of data), but the expected uncertainty regarding a given number of clients.

FIGS. 9A-9H illustrate a method of generating a decision tree. Building a decision tree first requires the definition of a classification. The classification can be any property of the clients, and determines the principal structure of the histograms in the final tree. In some embodiments, the property comprises a predicate-object pair. If a classification with binary values is employed, binary histograms like (N=3 P=9) results. In all other cases, multi-valued histograms (Standard=1 Enterprise=4 Add-On=3 Support=9) is produced.

As shown in FIG. 9A, a data array 900 is provided having a plurality of classification 902. The data array 900 includes a number of entries 904, in which each entry includes a client field that maps to a subject element. The data array is populated with the predicate-object pair 906 corresponding to the subject element. The stated goal, in some implementations, maps to a give predicate-object pair 908 (here shown as "Property E").

With this classification, the system 112 then evaluate all other properties for all clients 904 (e.g., Properties A, B, C, and D) and simply account for the client classification per property. The result is a histogram for each property. The property with the histogram that has the lowest entropy (=lowest uncertainty) is chosen for the root node of the tree.

Recursively:

The given clients are divided into two or more groups, based on the value the client has for the chosen root node property. This could produce non-binary trees or a binary tree. When a binary tree is employed, the system uses the two groups to calculate two new root nodes for the two sub-trees. The system may choose the two nodes based on information gain for the clients in the respective sub-trees. The system do not allow an already selected property to be used again in a sub-tree. The false/true value is put as a label to the edges to the root nodes of the two sub trees. Recursively this process is repeated until (i) either all of the properties are used or (ii) if the entropy is zero (only (N=X P=0) or (N=0 P=X) histograms).

Figure 9B:
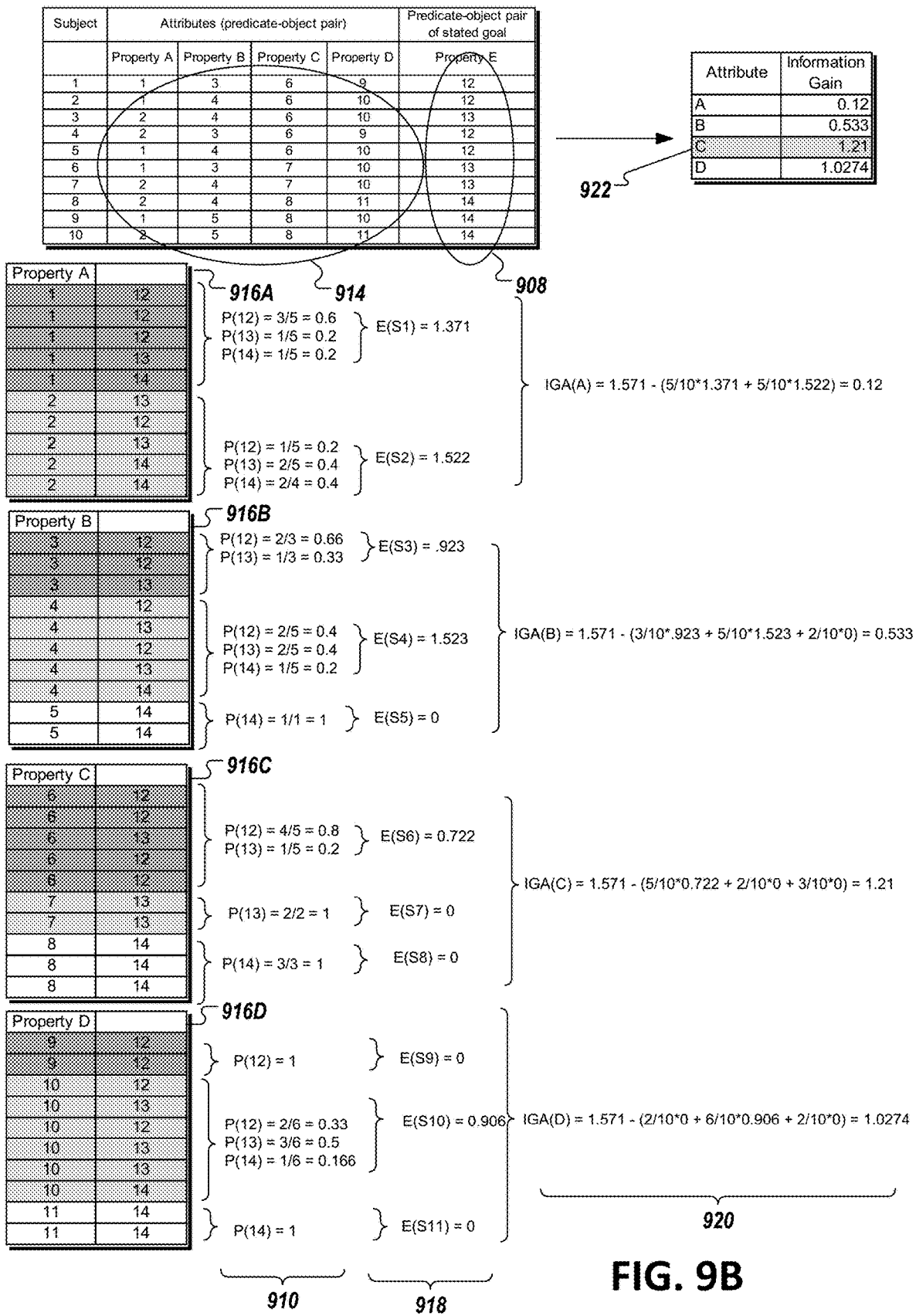

A histogram 910 of Property E is shown in FIG. 9B. An example entropy score 912 for a classification (i.e., for Property E) is also shown, the score being derived from Equation 1.

FIG. 9B also illustrates an evaluation of the properties for the clients with respect to the classification. As shown, for each property, a frequency that the given property appears in the matrix is determined (here, the properties A-D 916 are shown sorted merely for illustration).

The system can evaluate each entry within the matrix to determine the frequency that a given property appears in the matrix. The frequency can be used to determine a histogram 910 for each property based on the classification 908; and the entropies 918 are then derived from a given set of histograms 908. An information gain 920 is then determined for each property based on Equation 2. The attribute having the highest information gain 922 is determined from among the information gain of each property.

FIG. 9C illustrates a separation of the matrix into two or more groups 924, 926, 928 based on the value the client has for the chosen root node property. A resulting tree based on the separation is shown in FIG. 9D in which properties (i.e., predicate-object pair shown as integers) form a tree structure based on the information gain.

Figures 9E, 9F, 9G, 9H:
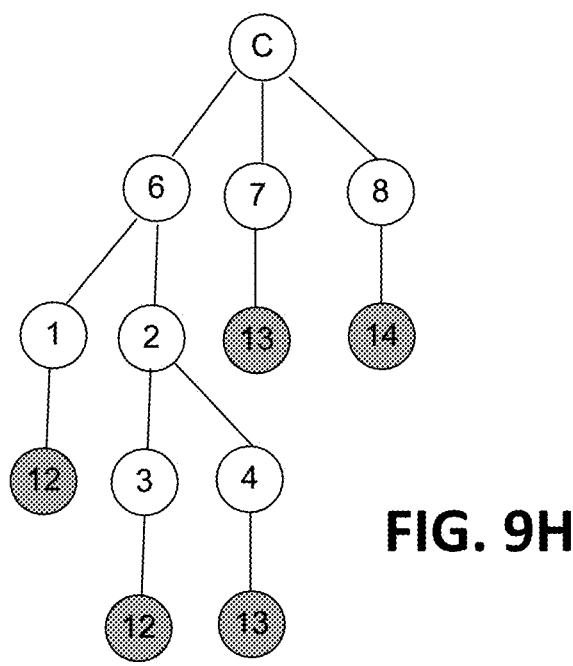

FIG. 9E illustrates an evaluation of the remaining portion of the matrix. The properties are evaluated in a similar manner as described in relation to FIG. 9B. FIG. 9F illustrates the information gain from each of the remaining properties with respect the stated classification.

FIG. 9G illustrates further separation of the remaining portion of the matrix into two or more groups 930, 932. FIG. 9H illustrates a generated decision tree built based on the stated goal.

Interpreting a Decision Tree

When the decision tree has been built, the system know the histogram in each node and in addition the clients in each leaf node. In addition, each leaf node is associated with a given client. The path from the root node to each leaf node constitutes a set of properties with their values that each client in the leaf node matches. The system, in some implementations, interprets this path as "AND" conditions, such as "A=true AND B=false AND C=true AND D=true". To this end, it is clear that reuse of the same property on the same path does not provide any benefit on the entire expression.

Paths in decision trees can become large. The system, in some implementation, preferably selects the shortest. The path from the root node to sub-node path may be referred to as a segment. There are two types of segments: base segments and target segments. The base segment is described by a set of properties with their values. This segment is computable by a top-down path in the decision tree. The target segment is thus a one-node extension to this path, so that the target segment becomes the base segment plus one added positive (non-false) decision tree node.

In some embodiments, the root node of the tree is chosen for a given feature that divides the clients so that the entropy in the root node histogram is minimal. The system then determine the sub-nodes in the tree by maximizing the information gain for the subsequently split client sets. To this end, the root node property is the most valuable property to consider for deducing the unknown clients classification. Properties associated in the leaf nodes of the decision tree are less valuable for the entire client base, but still provide a significant information gain for a smaller subset of all the clients. In some implementations, the system employs a ID3 decision tree or a C4.5 decision tree. Description of the ID3 decision tree model may be found in J. R. Quinlan, "Induction of Decision Trees," 1, 1 Mach. Learn. 81-106 (1986). Description of the C.45 algorithm may be found in J. R. Quinlan, "C4.5: Programs for Machine Learning" Morgan Kaufmann Publishers (1993). The content of each of these references is hereby incorporated by reference in its entirety.

The given decision tree algorithm has implementation challenged. For example, storing all properties for all clients can be challenging, even if they are sparsely set, if there are numerous properties (e.g., a set of 100000 properties, which may be common a website having a lot of web pages) and numerous clients (e.g., a set of 5 million clients). In addition, the created decision tree may have a big depth or imbalance, making it impractical for future use and human interpretation. In addition, the leaf nodes can potentially not many clients associated with them and thus have limited value for practical purposes. This is sometimes referred to as overfitting. In addition, the information gain of a certain node can be miniscule and not worth the computation effort.

To address these difficulties, the system employs a number of provisions. The provisions may be controlled by parameters as well as being hard coded.

In order to memory-efficiently store the sparse property information for a large number of clients, the system use strings in memory. The system further avoids storing duplicate strings in the database. It is expected that for many (if not most) websites, the system can calculate the decision tree completely in memory (e.g., volatile, i.e., RAM, with having to employ page files within persistent memory). An example of string objects 802 are shown in FIG. 8. The string objects includes integers 804 representing a given predicate-object pair in some implementations.

In addition, the system pre-processes the properties to reduce the number of properties to a window of operation that is optimized for a given framework. It is observed that this number is in the range of 1 and 65485 in the Java and .Net framework.

In some embodiments, the system reduces the number of properties by requiring that a property needs to be used by at least X clients (i.e., subject element). It is assumed that many properties are not be significant on the decision tree calculation as their impact (even if they provide a good entropy value) on the entire client base are low.

In some embodiments, the system stops the calculation of further sub-trees when the selected property provides too little information gain (also known as overfitting within information theory). This situation may describes a situation where the decision tree accurately represents the known clients, yet does not provide adequate abstraction needed for classifying unknown clients (i.e., the data is not generalizing enough). In some embodiments, the system stops the calculation of further sub-trees when the calculated information gain from a set of properties is below a pre-defined threshold.

In some embodiments, the system limits the depth of the created decision trees. It is observed that this limitation reduces the calculation effort for the entire tree (which may be great). Since a deeper node in the decision tree employs fewer clients for its calculation, the deep/leaf nodes are less efficient for predictions on the entire client base. The system prefers shorter paths over longer ones.

In some embodiments, the system avoids storing the same string a second time in the database. To this end, a unique integer is mapped to a string in the data array. As shown in FIG. 8, a string is represented as an integer concatenated into a single string. The system associates a reference of the string to a given subject element (i.e., client) and retrieves and operate on the string through the reference. To this end, the system densely stores the data in the array within memory. The array may be stored in a database, as well, and in such format. Since the core algorithm is not interested in the actual string values as it does not perform any interpretation on them. In some embodiments, the integers are delineated by a non-integer symbol, such as a space or a punctuation (e.g., comma, semi-colon, colon, period, among other symbols or 20 characters).

Figure 7:
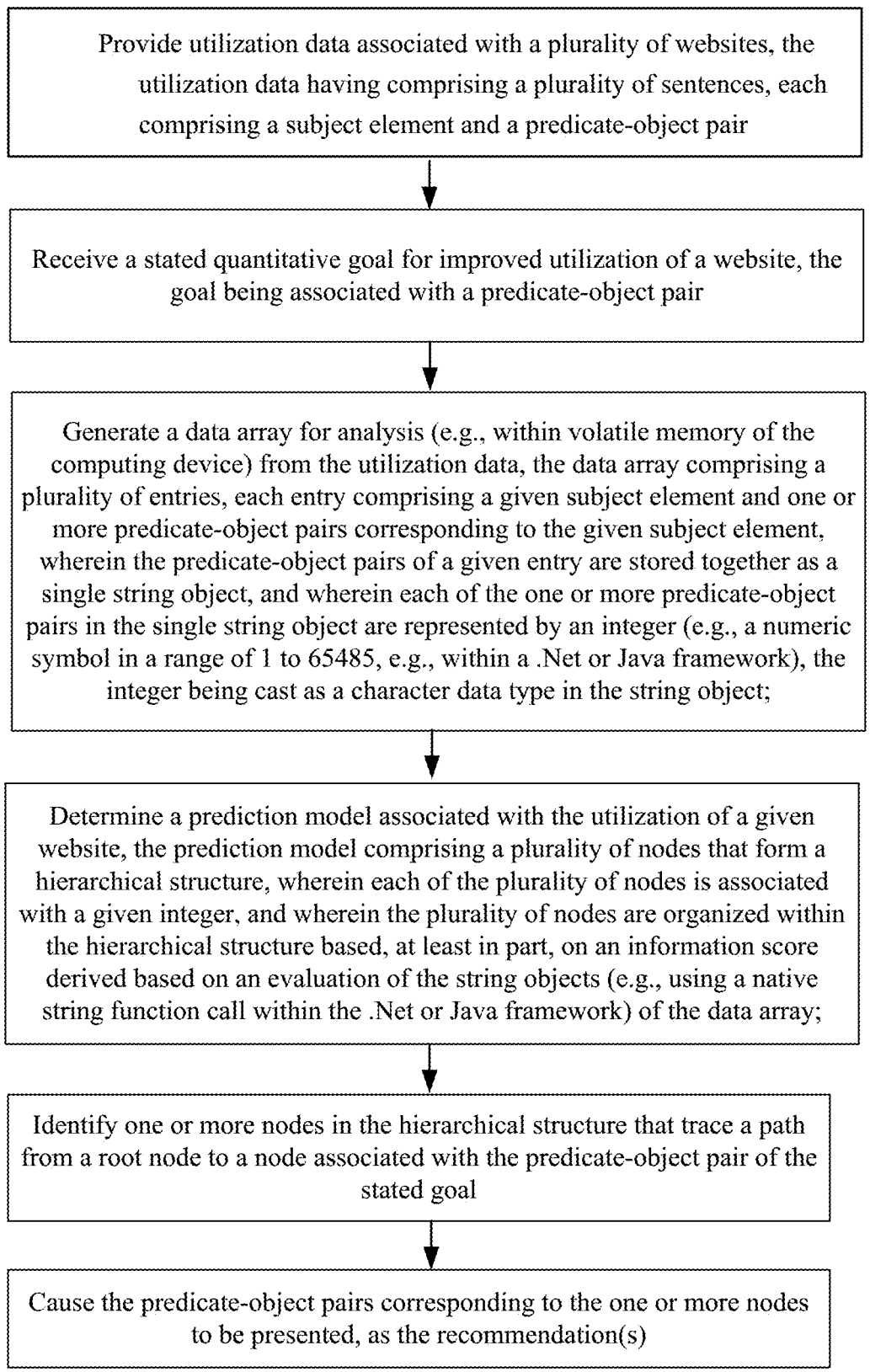
FIG. 7 shows an exemplary method for analyzing data formatted as strings objects to provide recommendations to an owner or manager of a given website to improve utilization of the given website.

When processing large sparse matrices in memory, the storage of the matrix elements must be as memory efficient as possible so that memory capacity is not exceeded. On the other hand, access to the elements must still be efficient and preferably comparable to hash tables or sorted collections. FIG. 7 shows an exemplary method for analyzing data formatted as strings objects to provide recommendations to an owner or manager of a given website to improve utilization of the given website.

In some embodiments, such as those employing .Net/Java framework, integer numbers in the range 1 . . . 65485 can be leveraged to store that information in string objects. This is not to be done via a simple string representation, but by casting the ushort/short/int/uint/long/ulong value (namely, a unsigned short integer, a short integer, an integer, an unsigned integer, a long integer, and an unsigned long integer) of a given number to a char. The char value can then be stored in a string instance. Many such char values can be stored and retrieved in a string. Because string is a native type to these frameworks, the usage of strings is very efficient and fast. In some embodiments, some string routines are optimized to the processor level, e.g. string:: IndexOf(char). The solution is most effective when using the stated range. This is both due to the direct support for string operations in the processor machine language as well as the dense and cache friendly nature of arrays.

A zero value should be avoided for interoperability reasons, and values larger than 65485, in some implementations, have been observed to show issues in the character comparison. Without being tied to a particular theory, this limitation is most likely due to Unicode special handling associated with the string native function call.

Other benefits of strings may also be employed in the implementation of the algorithm. Strings are immutable, thus can be easily shared between various users. In addition, strings are memory-efficient, having less overhead for small amounts of values compared to a list based storage. This can aid the Garbage Collector for larger numbers of stored items. In addition, string operations like GetHasCode and Equals, which are optimized, may be employed. In addition, strings can be searched efficiently, for example, using native function calls such as String::IndexOf( ), String::LastIndexOf( ), String::IndexOfAny( ), String::LastIndexOfAny( ), and String::Contains( ) methods. The native function calls may be selected based on the integer value being searched. For example, a large integer is expected to appear in a later portion of a given string while a small integer is excepted to appear in the earlier portion of a given string.

To this end, in some embodiments, the system employs Indexof( )(which searches from the beginning of an object) and LastIndexof( )(which searches from the end of the object) depending on the integer number to further improve the searching speed. In some embodiments, the system accesses a single character in the string using the [ ] operator. In some embodiments, the system employs the String::Concat( ) function call to add an integer to a new or existing string object. In some embodiments, the system employs serializing/deserializing of the string.

In some embodiments, the system perform binary searches to sort the character values before the string is created. The operation may be employed as lookup for large strings. For short strings (e.g., length less than 20), the system may employ the IndexOf function.

Figure 10:
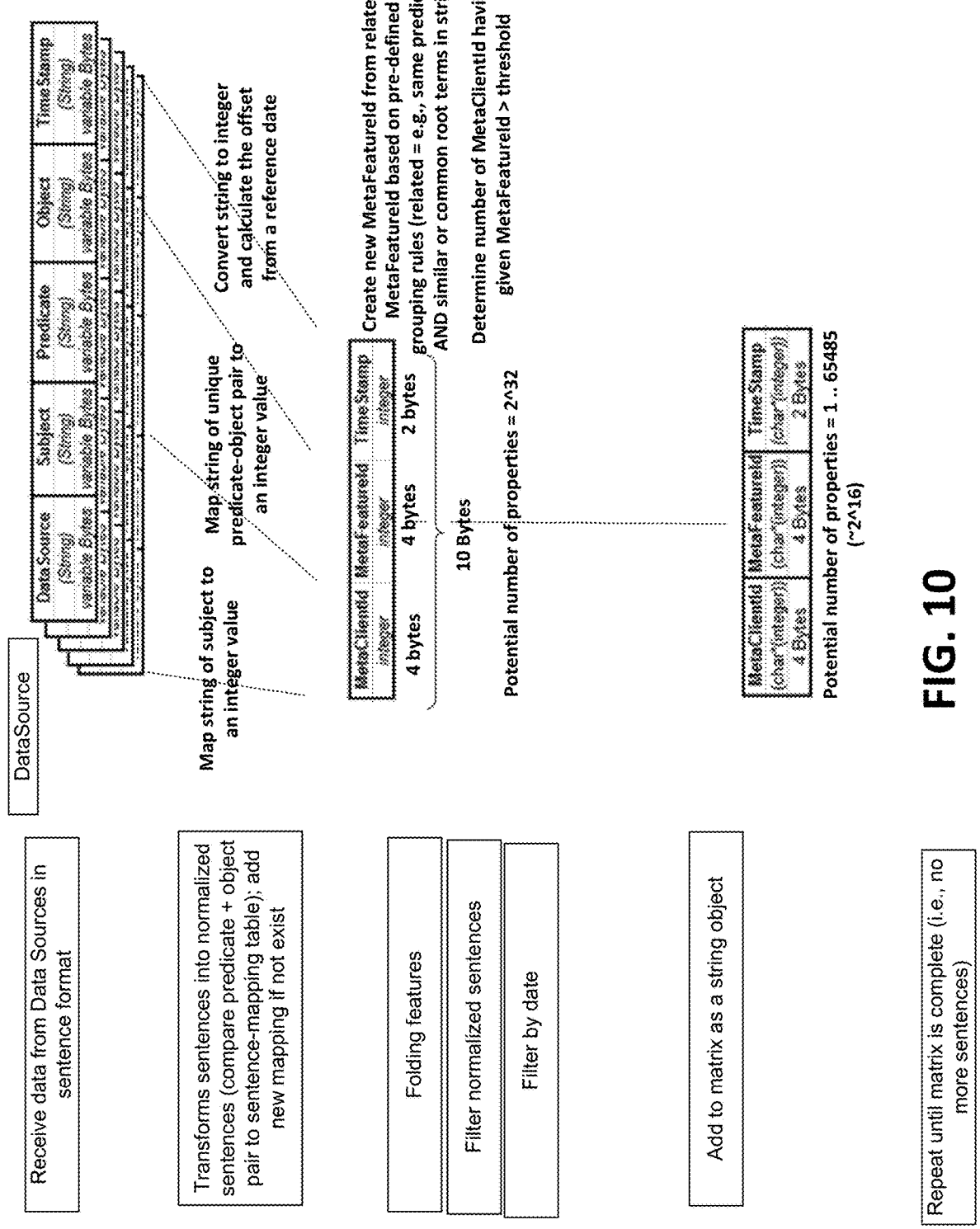
FIG. 10 illustrates an exemplary method for pre-processing data, e.g., by folding "like" data together and filtering irrelevant data.

To employ the usage of string objects within the optimal range of integers, the system may employ pre-processing of the data. Referring now to FIG. 10, an exemplary method for preprocessing data, e.g., by folding "like" data together and filtering irrelevant data, is illustrated.

In some embodiments, the system receives information in the form of a sentence (e.g., subject, predicate, and object elements) with meta data information. Together, the sentence and meta data are referred to as a raw sentence 1012. In some embodiments, the raw sentence is a quintuple consisting of a DataSource 1002, Subject 1004, Predicate 1006, Object 1008, and Timestamp 1010. With this raw form, the information for the sparse matrix input of the decision tree comes into analysis system. The information is sparse in that not every client would have bought something, for example, and therefore the 'has bought' property would not be present for every clients. Likewise not all clients, for example, would have visited a given web page.

In order to abstract and condense the information in the sentences, the analysis system, in some implementations, transforms the raw input sentences 1012 (as it is coming from the data sources) into normalized sentences 1020 having the form of a MetaClientId 1014, FeatureId 1016, and Timestamp 1018. This normalization step (step 1002) converts the data from a string representations (that can be of any size) to integers that uses 10 bytes of data for a given sentence. Thus any additional single action of a client only consumes an additional ten bytes. In some embodiments, the timestamp 1018 is defined as a day offset from the date Jan. 1, 2001. The timestamp 1018 does not include hours/minutes/seconds information. In some embodiments, the raw sentences (with strings) is stored by an API server (i.e., a web-facing component) into Azure Blobs. A sentence normalizer component of the Azure background worker is then employed to perform the transformation and to store the resulting output into a SQL Azure table 1020 (also referred to as sentence table 1020). The sentence table 1020 gets very large yet has a very short row size.

In some embodiments, the MetaClientId 1014 is an abstraction for the subjects coming from different data sources. The MetaCliendId 1014 is an integer identifier and is used, in some implementations, for all later steps in the decision tree calculation and personalization. Each data source can define its own subject identification mechanism, for example, as globally unique identifiers (GUIDs) or integer-based customer identifiers (i.e., integer customer Ids), among others. The MetaClientId 1014, in some implementation, is mapped to a given data source 104a-104c.

In some embodiments, the system also transforms the predicate and object information from the raw sentences in a predicate-object pair in which each unique predicate-object pair is employed as a string value (i.e., a 4 type integer) within the data array. In some embodiments, the predicate-object pair are stored as rows in a Feature table 1022 (e.g., a SQL Azure table 1020) that is used to identify the string of characters of the predicate-object value. The system performs the computation of the decision tree using the normalized input data (MetaClientId 1014, FeatureId 1016, Timestamp 1018). It is important to reduce the amount of data the calculation needs to process but still providing meaningful output. This can happen in two ways: limiting the number of rows by applying date filters, and folding features.

Feature folding is a process where for the same predicate value, the system maps different features (so, different object values) to a new entity identifier, namely the MetaFeatureId 1016. The feature folding reduces overfitting by promoting generalization of a given data.

Folding, in some implementation, is employed for certain predicate elements, such 'has visited'. In some embodiments, the feature folding process (which is done before the actual decision tree calculation is performed) maps two or more different properties (i.e., object element) to a single MetaFeatureId 1016. For example, a first predicate-object pair of ['has visited'+'http://sitefinity.com/about_us.aspx' ] and a second predicate-object pair of ['has visited'+'http://sitefinity.com/contact.aspx' features] (which are already abstracted to two integers via normalization, in some implementations) are collapsed together to a new MetaFeatureId 1016. A MetaFeatureId 1016 is identified by another integer value and it is important to distinguish if a particular value actually is a MetaFeatureId 1016. Not all predicates allows feature folding, and some predicates might require special rules for performing the folding. For example, the rule for folding the 'has visited' predicate may include the hierarchical nature of the URLs in which only common URI path prefixes are mapped together. Other predicates might define different rules like simple prefix mapping. Feature folding is performed so that the importance of single features is combined together. Often, single URLs provide no real value to a decision tree, yet if similar URLs are combined, a meaningful decision tree can be build. For example, visits to a particular and very specific knowledge base article may be too specific, yet visits to all the knowledge base articles could be significant. In some embodiments, folded feature of predicate-object pairs are combined by logical "OR".

In some embodiments, the system employs feature folding before the actual decision tree is calculated and is controllable by the minimum number of clients that a MetaFeatureId 1016 needs to provide to the algorithm. If that threshold is not met, feature folding is used.

In some embodiments, the system detects situations, where a single foldable feature provides significant decision tree input alone, but the 'surrounding' features do not. To this end, the system keeps the one significant feature (and maps it alone to a MetaFeatureId) and folds all other features. This would allow the one significant feature to be preserved and visible in the final decision tree.

In some embodiments, the decision tree algorithm input is controllable by the minimum information gain a MetaFeatureId 1016 needs to provide. With this control, a MetaFeatureId 1016 that is provided by enough clients can still be excluded from the final decision tree when it is actually not significant enough (or does not provide any gain in entropy reduction). This may help avoid the generation of an unbalanced decision trees with high depth (i.e., decision tree resembling a long list)

In some embodiments, the system computes a binary decision tree. By employing the normalized sentences 1020 (e.g., MetaClientId 1014, MetaFeatureId 1016, Timestamp 1018), a value is either present or not. This allows for quick searches in the server via SQL of the form EXISTS(select 1 from table where [MetaClientId]=@param1 and [MetaFeatureId]=@param2).

In some embodiments, when a sentence is detected during import into analysis system that affects the classification for a particular client, this client classification information is copied out into the SQL table (namely, a Client Classifications table 1026). Clients that did not provide a classification value can still have a row in this table, as the default value of zero is not a valid classification value.

In some embodiments, the analysis system stops the importation of sentence into the decision tree calculation for a particular client when the client has already reached the goal and received a classification (e.g., has bought something). This feature hides sentences from the decision tree calculation of subsequent activities on the web site that would have no significance to the website manager or manager.

In some embodiments, the analysis system stops the classification import into the decision tree calculation based on a timestamp information associated with the classification. In some embodiments, the system may filter based on a start-end time. To this end, older clients (with no sentences in the time frame) could be left out and would not appear.

In some embodiments, the decision tree calculation method offers three different ways to handle meta features reuse during the execution of the calculations: (i) DifferentSubpath (the default), (ii) DifferentLevel (requires the meta feature to be reused on a different level so that the same meta feature cannot appear a second time on the same tree level and (iii) Disallow (avoids the same meta feature altogether).

In some embodiments, the decision tree is recalculated daily (i.e., every 24 hours) so that new activities from clients are included regularly. Additionally, the current histogram for the root node is persisted to create a historical data for the goal that can be retrieved later. With such historical data, the analysis system can display how the client base behaved over time with regards to the Decision Tree classification. For example, the system can display the number of clients having bought a standard edition (goal object defined), or the number of all clients having bought (any edition, no goal object defined).

Not all clients that are considered in the decision tree have a classification value. A visitor to the web site is not necessarily a customer. This missing/present classification can further be used, in some implementations, to divide the client base.

After the decision tree has been built, the analysis system know from the decision tree nodes which properties appears to have an influence on the decision tree classification property. The root node holds the most influencing property. Decision trees makes visible this influence. By uncovering the hidden dependencies, the analysis system automatically recommends actions to influence the classification.

In another aspect of the technology, the system may employ a 'business gain' score instead of information gain in selecting sub-nodes to add to a given decision tree. The system may calculate this as the difference in business that two histograms represent. To this end, a different classification values (the values for the elements in the histogram) may be employed rather than entropy.

For example, the system may associate $150 business value with a sold "Add-On", "$1000" with a "standard" edition, "$399" with a "support contract" and "$10,000" with an "enterprise" edition. Then we calculate a histogram like ("Add-On"=2 "Enterprise"=3 "Standard"=8) as a $38, 300-business value. The entropy for a (Add-On=8 Enterprise=2 Standard=3) histogram would be the same, yet the business value difference is also present (i.e,. $24,200).

The 'business gain' would lead to a decision tree with different structure and ordering of the properties, which better reflects a business reality. One can think of the information gain as one special business gain calculation where the value of each classification is equal to 1.

In some embodiments, recommendations are derived from the decision tree by finding nodes for positive (true) result values. A recommendation of a non-action is not effective recommendation. The system sorts nodes coming from the decision tree based on an 'impact' formula. This formula works by evaluating differences in classified clients and unclassified ones and provides an order on the target segments to choose the most impacting one. There could be more than one path in the decision tree to show as a recommendation. The system sorts the recommendations in order of highest impact first, for display.

Recommendations are calculated from the decision tree and therefore recalculated every day. As feature folding happens for every decision tree computation, it might be different each time.

When the recommendations look strange, this can have many reasons. The one that is most likely to occur is the absence of a strong correlation between feature and classification. A campaign can logically be started to influence the goals root histogram. The campaign is defined by the target segment, which is a root node path in the DT.

Because the decision tree is recalculated over time, and each recalculation can create different feature folding, the system maintains a copy of the feature folding mapping information from the source decision tree to fix or update the meaning of the MetaFeatureId used in the campaign. Because the analysis system creates a new mapping for each campaign, new unique identifiers for the meta features, specific to the given campaign, is created. This has the desirable side-effect of making a campaign id redundant and we can avoid storing it explicitly.

Figure 11:
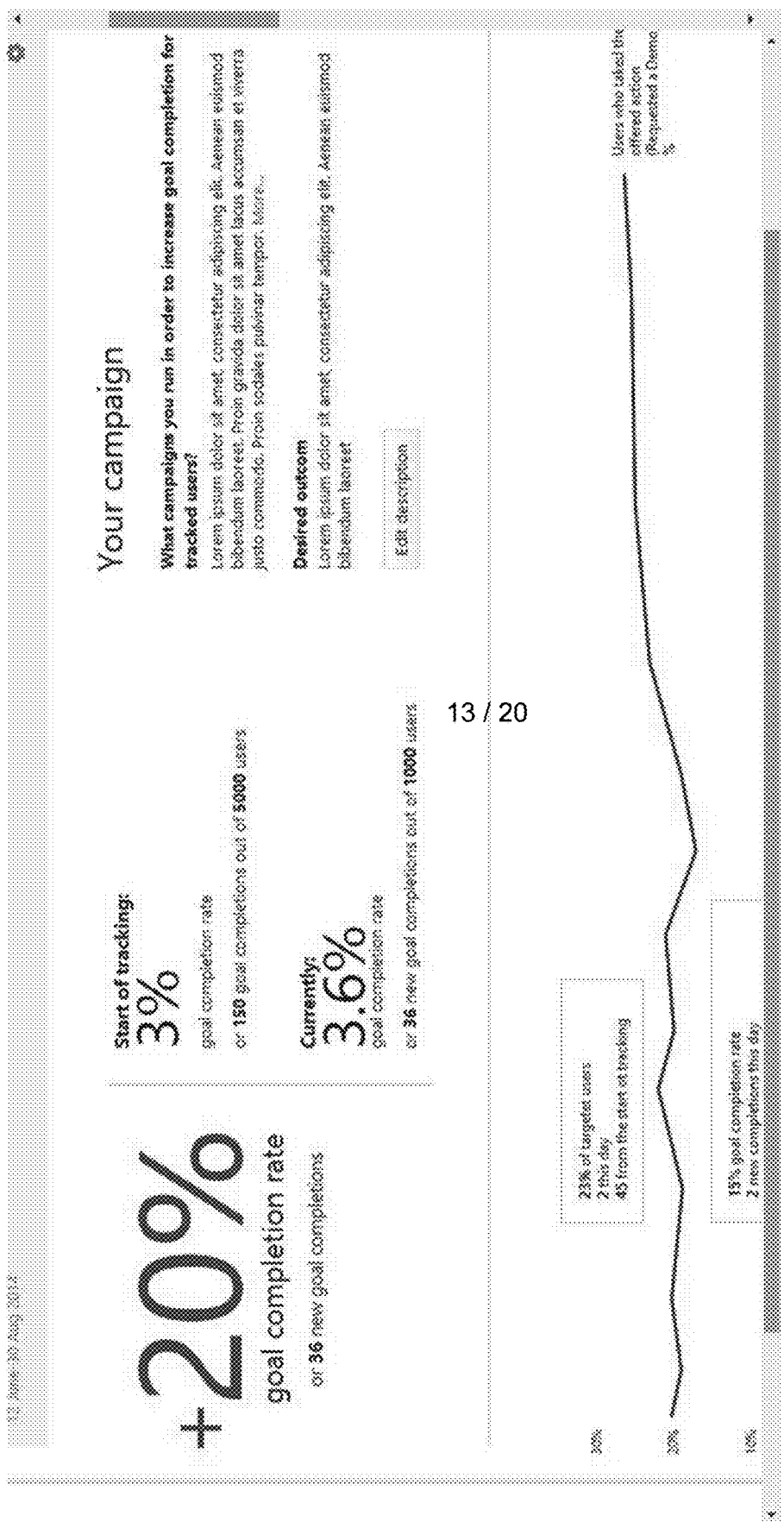
FIG. 11 is an exemplary graphical user interface for tracking a campaign.

A campaign can specify a start and end date. FIG. 11 is an exemplary graphical user interface for tracking a campaign.

When normalized sentences are imported into analysis system, the import sees which campaigns are active and maintain a row in the SQL [ClientClassifications] and [ClientFeatures] table. This means, the information for the campaigns is copied from the sentences into these special tables.

When a campaign is active and the current date is in the specified range, Sitefinity (i.e. website hosting system) can then actively test if a web page should be displayed (or any other action should be performed). This test needs to return in a limited amount of time (like 200 ms) and actually performs a bunch of (negated) EXISTS(select 1 from [ClientFeatures] c where c.[MetaClientId]=@param1 and c.[MetaFeature]=@param2) SQL statements.

It is important to keep the ClientFeatures table well indexed to that those EXISTS conditions can efficiently be processed by the SQL server.

Like the Goals, the Campaigns creates snapshots of their statistics (number of clients in the base segment, target segment, . . . ) so that historical data becomes available. The active campaigns will create those statistics at the same time when the new decision tree for their goal is calculated.

Figure 17:
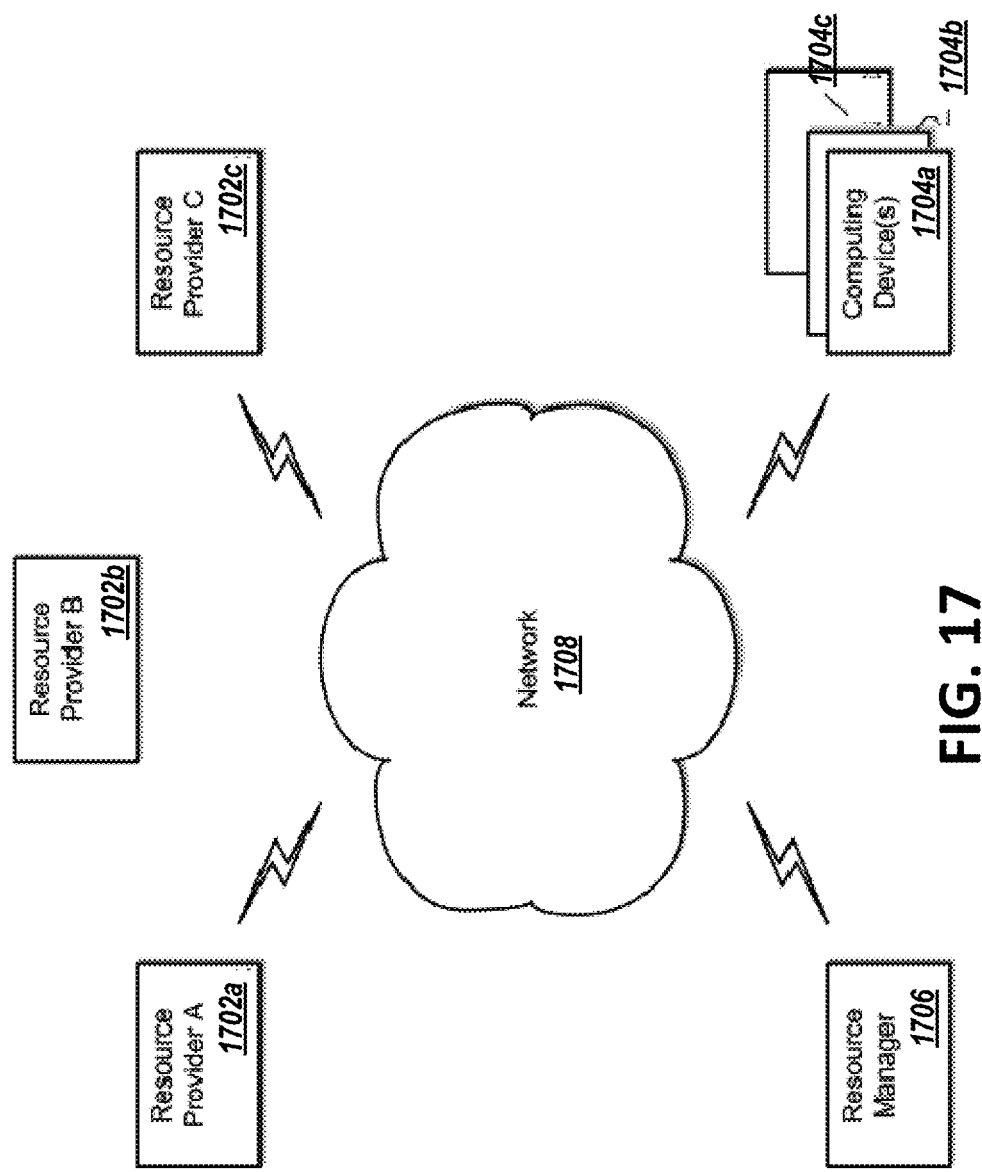
FIG. 17 is a block diagram of an example network environment for collecting and analysis data using sentence model.

As shown in FIG. 17, an implementation of an exemplary cloud computing environment 1700 for collecting and manipulating user data using a small cell base station data is shown and described. The cloud computing environment 1700 may include one or more resource providers 1702a, 1702b, 1702c (collectively, 1702). Each resource provider 1702 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 1702 may be connected to any other resource provider 1702 in the cloud computing environment 1700. In some implementations, the resource providers 1702 may be connected over a computer network 1708. Each resource provider 1702 may be connected to one or more computing device 1704a, 1704b, 1704c (collectively, 1704), over the computer network 1708.

The cloud computing environment 1700 may include a resource manager 1706. The resource manager 1706 may be connected to the resource providers 1702 and the computing devices 1704 over the computer network 1708. In some implementations, the resource manager 1706 may facilitate the provision of computing resources by one or more resource providers 1702 to one or more computing devices 1704. The resource manager 1706 may receive a request for a computing resource from a particular computing device 1704. The resource manager 1706 may identify one or more resource providers 1702 capable of providing the computing resource requested by the computing device 1704. The resource manager 1706 may select a resource provider 1702 to provide the computing resource. The resource manager 1706 may facilitate a connection between the resource provider 1702 and a particular computing device 1704. In some implementations, the resource manager 1706 may establish a connection between a particular resource provider 1702 and a particular computing device 1704. In some implementations, the resource manager 1706 may redirect a particular computing device 1704 to a particular resource provider 1702 with the requested computing resource.

Figure 18:
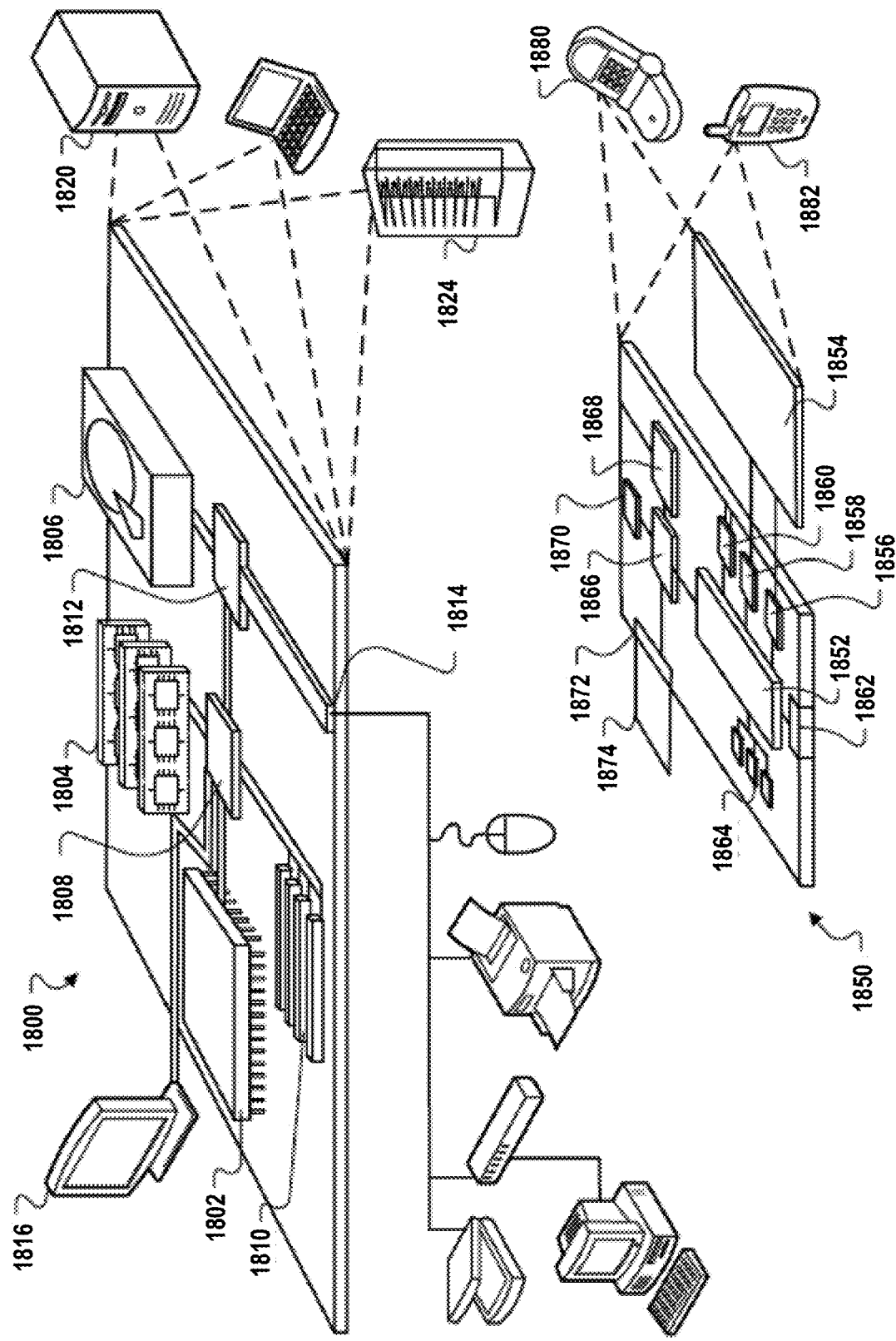
FIG. 18 is a block diagram of an example computing device and an example mobile computing device.

FIG. 18 shows an example of a computing device 1800 and a mobile computing device 1850 that can be used to implement the techniques described in this disclosure. The computing device 1800 is intended to represent various forms of digital computers, such as laptops, desktops, workstations, personal digital assistants, servers, blade servers, mainframes, and other appropriate computers. The mobile computing device 1850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1800 includes a processor 1802, a memory 1804, a storage device 1806, a high-speed interface 1808 connecting to the memory 1804 and multiple high-speed expansion ports 1810, and a low-speed interface 1812 connecting to a low-speed expansion port 1814 and the storage device 1806. Each of the processor 1802, the memory 1804, the storage device 1806, the high-speed interface 1808, the high-speed expansion ports 1810, and the low speed interface 1812, are interconnected using various busses, and may be mounted on a common motherboard or in other manners as appropriate. The processor 1802 can process instructions for execution within the computing device 1800, including instructions stored in the memory 1804 or on the storage device 1806 to display graphical information for a GUI on an external input/output device, such as a display 1816 coupled to the high-speed interface 1808.

In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1804 stores information within the computing device 1800. In some implementations, the memory 1804 is a volatile memory unit or units. In some implementations, the memory 1804 is a non-volatile memory unit or units. The memory 1804 may also be another form of computer-readable medium, such as a magnetic or optical disk.

The storage device 1806 is capable of providing mass storage for the computing device 1800. In some implementations, the storage device 1806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1802), perform one or more methods, such as those described above. The instructions can also be stored by one or more storage devices such as computer- or machine-readable mediums (for example, the memory 1804, the storage device 1806, or memory on the processor 1802).

The high-speed interface 1808 manages bandwidth-intensive operations for the computing device 1800, while the low-speed interface 1812 manages lower bandwidth-intensive operations. Such allocation of functions is an example only. In some implementations, the high-speed interface 1808 is coupled to the memory 1804, the display 1816 (e.g., through a graphics processor or accelerator), and to the high-speed expansion ports 1810, which may accept various expansion cards (not shown). In the implementation, the low-speed interface 1812 is coupled to the storage device 1806 and the low-speed expansion port 1814. The low-speed expansion port 1814, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1800 may be implemented in a number of different forms, as shown in the figure. For example, it may be implemented as a standard server 1820, or multiple times in a group of such servers. In addition, it may be implemented in a personal computer such as a laptop computer 1822. It may also be implemented as part of a rack server system 1824. Alternatively, components from the computing device 1800 may be combined with other components in a mobile device (not shown), such as a mobile computing device 1850. Each of such devices may contain one or more of the computing device 1800 and the mobile computing device 850, and an entire system may be made up of multiple computing devices communicating with each other.

The mobile computing device 1850 includes a processor 1852, a memory 1864, an input/output device such as a display 1854, a communication interface 1866, and a transceiver 1868, among other components. The mobile computing device 1850 may also be provided with a storage device, such as a micro-drive or other device, to provide additional storage. Each of the processor 1852, the memory 1864, the display 1854, the communication interface 1866, and the transceiver 1868, are interconnected using various buses, and several of the components may be mounted on a common motherboard or in other manners as appropriate.

The processor 1852 can execute instructions within the mobile computing device 1850, including instructions stored in the memory 1864. The processor 1852 may be implemented as a chipset of chips that include separate and multiple analog and digital processors. The processor 1852 may provide, for example, for coordination of the other components of the mobile computing device 1850, such as control of user interfaces, applications run by the mobile computing device 1850, and wireless communication by the mobile computing device 1850.

The processor 1852 may communicate with a user through a control interface 1858 and a display interface 1856 coupled to the display 1854. The display 1854 may be, for example, a TFT (Thin-Film-Transistor Liquid Crystal Display) display or an OLED (Organic Light Emitting Diode) display, or other appropriate display technology. The display interface 1856 may comprise appropriate circuitry for driving the display 1854 to present graphical and other information to a user. The control interface 1858 may receive commands from a user and convert them for submission to the processor 1852. In addition, an external interface 1862 may provide communication with the processor 1852, so as to enable near area communication of the mobile computing device 1850 with other devices. The external interface 1862 may provide, for example, for wired communication in some implementations, or for wireless communication in other implementations, and multiple interfaces may also be used.

The memory 1864 stores information within the mobile computing device 1850. The memory 1864 can be implemented as one or more of a computer-readable medium or media, a volatile memory unit or units, or a non-volatile memory unit or units. An expansion memory 1874 may also be provided and connected to the mobile computing device 1850 through an expansion interface 1872, which may include, for example, a SIMM (Single In Line Memory Module) card interface. The expansion memory 1874 may provide extra storage space for the mobile computing device 1850, or may also store applications or other information for the mobile computing device 1850. Specifically, the expansion memory 1874 may include instructions to carry out or supplement the processes described above, and may include secure information also. Thus, for example, the expansion memory 1874 may be provide as a security module for the mobile computing device 1850, and may be programmed with instructions that permit secure use of the mobile computing device 1850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. That the instructions, when executed by one or more processing devices (for example, processor 1852), perform one or more methods, such as those described above. The instructions can also be stored by one or more storage devices, such as one or more computer- or machine-readable mediums (for example, the memory 1864, the expansion memory 1874, or memory on the processor 1852). In some implementations, the instructions can be received in a propagated signal, for example, over the transceiver 1868 or the external interface 1862.

The mobile computing device 1850 may communicate wirelessly through the communication interface 1866, which may include digital signal processing circuitry where necessary. The communication interface 1866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1868 using a radio-frequency. In addition, short-range communication may occur, such as using a Bluetooth®, Wi-Fi™, or other such transceiver (not shown). In addition, a GPS (Global Positioning System) receiver module 1870 may provide additional navigation- and location-related wireless data to the mobile computing device 1850, which may be used as appropriate by applications running on the mobile computing device 1850.

The mobile computing device 1850 may also communicate audibly using an audio codec 1860, which may receive spoken information from a user and convert it to usable digital information. The audio codec 1860 may likewise generate audible sound for a user, such as through a speaker, e.g., in a handset of the mobile computing device 1850. Such sound may include sound from voice telephone calls, may include recorded sound (e.g., voice messages, music files, etc.) and may also include sound generated by applications operating on the mobile computing device 1850.

The mobile computing device 1850 may be implemented in a number of different forms, as shown in the figure. For example, it may be implemented as a cellular telephone 1880. It may also be implemented as part of a smart-phone 1882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, an apparatus and method for collecting and manipulating transaction data are provided. Having described certain implementations of methods and apparatus for collecting and manipulating user data using a small cell base station, it will now become apparent to one of skill in the art that other implementations incorporating the concepts of the disclosure may be used. Therefore, the disclosure should not be limited to certain implementations, but rather should be limited only by the spirit and scope of the following claims.

Throughout the description, where apparatus, devices, and systems are described as having, including, or comprising specific components, or where processes and methods are described as having, including, or comprising specific steps, it is contemplated that, additionally, there are apparatus, devices, and systems of the present invention that consist essentially of, or consist of, the recited components, and that there are processes and methods according to the present invention that consist essentially of, or consist of, the recited processing steps. It should be understood that the order of steps or order for performing certain action is immaterial so long as the invention remains operable. Moreover, two or more steps or actions may be conducted simultaneously.

What is claimed is:

1. A method comprising:
   receiving, using one or more processors, a user input from a first user, wherein the user input specifies a first predicate-object pair describing a first action performable on a website;
   receiving, using the one or more processors, collected data describing past activities of a plurality of users;
   determining, using the one or more processors, a plurality of predicate-object pairs based on the collected data, the plurality of predicate-object pairs including the first predicate-object pair describing the first action;
   generating, using the one or more processors, a prediction model specific to the first predicate-object pair, the prediction model comprising a plurality of nodes that form a tree structure, wherein generating the tree structure includes:
      associating the first predicate-object pair describing the first action to a leaf node of the tree structure;
      selecting, from the plurality of predicate-object pairs, a second predicate-object pair as a root node for the tree structure based on one or more of an information gain and a business gain regarding the first predicate-object pair when evaluating the second predicate-object pair;
      selecting, from the plurality of predicate-object pairs, a third predicate-object pair as a first intermediate node for the tree structure based on one or more of an information gain and a business gain regarding the first predicate-object pair when evaluating the third predicate-object pair;
   identifying, using the one or more processors, a path in the tree structure that traces from the root node to the leaf node via the first intermediate node, the first intermediate node located between the root node and the leaf node in the path;
   determining, using the one or more processors, an intermediary action described by the third predicate-object pair associated with the first intermediate node; and
   presenting to the first user, using the one or more processors, a recommendation—to offer a second user to perform the intermediary action described by the third predicate-object pair associated with the first intermediate node, wherein the intermediary action steers the second user towards performing the first action described by the first predicate-object pair associated with the leaf node.

2. The method of claim 1, wherein the collected data comprises data from heterogeneous data sources converted into a plurality of sentences, a sentence comprising:

a subject element identifying an entity; and
a predicate-object pair including a predicate element describing an action of the entity in relation to an attribute, the attribute being described by an object element.

3. The method of claim 1, further comprising:
filtering, using the one or more processors, one or more predicate-object pairs from the plurality of predicate-object pairs of the collected data such that the one or more filtered predicate-object pairs are not used to generate the prediction model; and
wherein the filtering is based on one or more of (i) whether a number of subject elements having a given predicate-object pair satisfies a pre-defined number of subject elements, and (ii) a time value associated with a creation of a sentence of the one or more filtered predicate-object pair.

4. The method of claim 1, further comprising:
generating, using the one or more processors, a data array from the collected data, the data array comprising a plurality of entries, each entry comprising a given subject element and one or more predicate-object pairs corresponding to the given subject element, the one or more predicate-object pairs of a given entry being stored together as a single string object, and wherein each of the one or more predicate-object pairs in the single string object are represented by a numeric symbol; and
wherein each of the plurality of nodes is associated with the numeric symbol associated with a given predicate-object pair.

5. The method of claim 1, wherein the tree structure includes one or more intermediate nodes, and wherein the one or more intermediate nodes are organized within the tree structure based, at least in part, on one or more of (i) a frequency that a given predicate-object pair with which a given intermediate node is associated appears in the collected data and (ii) a frequency that the first predicate-object pair describing the first action appears in the collected data, wherein the frequency of the first predicate-object pair is determined based on an evaluation of string objects using a native string function call within one or more of a .Net and Java framework.

6. The method of claim 4, wherein one or more of generating the data array and generating the prediction model is performed in a volatile memory.

7. The method of claim 4, further comprising:
casting, as a char data type, integer-based data type selected from a group consisting of a unsigned short integer (ushort), a short integer (short), an integer (int), an unsigned integer (uint), a long integer (long), and an unsigned long integer (ulong).

8. The method of claim 1, further comprising:
folding, using the one or more processors, two or more predicate-object pairs of the collected data to form a folded predicate-object pair such that the folded predicate-object pair is used to generate the prediction model and such that the two or more predicate-object pairs used to generate the folded predicate-object pair are not associated with individual nodes.

9. The method of claim 8, wherein the folded predicate-object pair comprises a common predicate element and, as an object element, a common portion of a URL or URI address.

10. The method of claim 1, wherein the root node is associated with a lowest entropy.

11. The method of claim 1, wherein generating the tree structure includes:
for each predicate-object pair in the plurality of predicate-object pairs, computing the information gain regarding the first predicate-object pair of the first action when evaluating the predicate-object pair, the information gain being computed based on a frequency at which the predicate-object pair appears in the collected data and a frequency at which the first predicate-object pair of the first action appears in the collected data;
wherein the root node is selected based on the information gain regarding the first predicate-object pair when evaluating the second predicate-object pair; and
wherein the first intermediate node is selected based on the information gain regarding the first predicate-object pair when evaluating the third predicate-object pair.

12. A system comprising:
a processor; and
a memory, the memory storing instructions that when executed cause the processor to:
receive a user input from a first user, wherein the user input specifies a first predicate-object pair describing a first action performable on a website;
receive collected data describing past activities of a plurality of users;
determine a plurality of predicate-object pairs based on the collected data, the plurality of predicate-object pairs including the first predicate-object pair describing the first action;
generate a prediction model specific to the first predicate-object pair, the prediction model comprising a plurality of nodes that form a tree structure, wherein generating the tree structure includes:
associating the first predicate-object pair describing the first action to a leaf node of the tree structure;
selecting, from the plurality of predicate-object pairs, a second predicate-object pair as a root node for the tree structure based on one or more of an information gain and a business gain regarding the first predicate-object pair when evaluating the second predicate-object pair;
selecting, from the plurality of predicate-object pairs, a third predicate-object pair as a first intermediate node for the tree structure based on one or more of an information gain and a business gain regarding the first predicate-object pair when evaluating the third predicate-object pair;
identify a path in the tree structure that traces from the root node to the leaf node via the first intermediate node, the first intermediate node located between the root node and the leaf node in the path;
determine an intermediary action described by the third predicate-object pair associated with the first intermediate node; and
present to the first user a recommendation to offer a second user to perform the intermediary action described by the third predicate-object pair associated with the first intermediate node, wherein the intermediary action steers the second user towards performing the first action described by the first predicate-object pair associated with the leaf node.

13. The system of claim 12, wherein the collected data comprises data from heterogeneous data sources converted into a plurality of sentences, a sentence comprising:
a subject element identifying an entity; and a predicate-object pair including a predicate element describing an action of the entity in relation to an attribute, the attribute being described by an object element.

14. The system of claim 12, instructions, when executed, further cause the processor to:

filter one or more predicate-object pairs from the plurality of predicate-object pairs of the collected data such that the one or more filtered predicate-object pairs are not used to generate the prediction model; and wherein the filtering is based on one or more of (i) whether a number of subject elements having a given predicate-object pair satisfies a pre-defined number of subject elements, and (ii) a time value associated with a creation of a sentence of the one or more filtered predicate-object pair.

15. The system of claim 12, the instructions, when executed, further cause the processor to:

generate a data array from the collected data, the data array comprising a plurality of entries, each entry comprising a given subject element and one or more predicate-object pairs corresponding to the given subject element, the one or more predicate-object pairs of a given entry being stored together as a single string object, and wherein each of the one or more predicate-object pairs in the single string object are represented by a numeric symbol; and wherein each of the plurality of nodes is associated with the numeric symbol associated with a given predicate-object pair.

16. The system of claim 12, wherein the tree structure includes one or more intermediate nodes, and wherein the one or more intermediate nodes are organized within the tree structure based, at least in part, on one or more of (i) a frequency that a given predicate-object pair with which a given intermediate node is associated appears in the collected data and (ii) a frequency that the first predicate-object pair describing the first action appears in the collected data, wherein the frequency of the first predicate-object pair is determined based on an evaluation of string objects using a native string function call within one or more of a .Net and Java framework.

17. The system of claim 15, the instructions, when executed, further cause the processor to:

cast, as a char data type, integer-based data type selected from a group consisting of a unsigned short integer (ushort), a short integer (short), an integer (int), an unsigned integer (uint), a long integer (long), and an unsigned long integer (ulong).

18. The system of claim 12, the instructions, when executed, further cause the processor to:

fold two or more predicate-object pairs of the collected data to form a folded predicate-object pair such that the folded predicate-object pair is used to generate the prediction model and such that the two or more predicate-object pairs used to generate the folded predicate-object pair are not associated with individual nodes.

19. The system of claim 18, wherein the folded predicate-object pair comprises a common predicate element and, as an object element, a common portion of a URL or URI address.

20. The system of claim 12, wherein the root node is associated with a lowest entropy.

* * * * *